US005722736A

United States Patent [19]
Cook

[11] Patent Number: 5,722,736
[45] Date of Patent: Mar. 3, 1998

[54] ELECTRONIC PNEUMATIC BRAKE SYSTEM

[75] Inventor: James M. Cook, Trona, Calif.

[73] Assignee: Zeftron, Inc., Montgomery, Ill.

[21] Appl. No.: 678,320

[22] Filed: Jul. 11, 1996

Related U.S. Application Data

[60] Provisional application No. 60/007,808, Nov. 30, 1995.
[51] Int. Cl.$^6$ .................................................. B60T 11/26
[52] U.S. Cl. ...................................... 303/15; 303/3; 303/7
[58] Field of Search ................................. 303/3, 15, 20, 303/28, 7, 9, 9.61

[56] References Cited

U.S. PATENT DOCUMENTS

| | | |
|---|---|---|
| 4,768,556 | 9/1988 | Rees . |
| 4,773,713 | 9/1988 | Rojecki . |
| 4,904,027 | 2/1990 | Skantar et al. . |
| 4,944,564 | 7/1990 | Balukin et al. . |
| 5,064,251 | 11/1991 | Romansky . |
| 5,071,198 | 12/1991 | Troiani . |
| 5,104,203 | 4/1992 | Ferri . |
| 5,172,316 | 12/1992 | Root et al. ................................. 303/3 |
| 5,192,118 | 3/1993 | Balukin et al. . |
| 5,222,788 | 6/1993 | Dimsa et al. . |
| 5,326,159 | 7/1994 | Hart et al. . |
| 5,335,974 | 8/1994 | Klink . |
| 5,358,315 | 10/1994 | Balukin . |
| 5,390,988 | 2/1995 | Shank . |
| 5,393,129 | 2/1995 | Troiani et al. . |
| 5,412,572 | 5/1995 | Root et al. . |
| 5,429,427 | 7/1995 | Gayfer . |
| 5,454,399 | 10/1995 | Kazakis et al. . |
| 5,501,512 | 3/1996 | Hart . |
| 5,503,467 | 4/1996 | Gaughan . |
| 5,503,469 | 4/1996 | Cunkelman . |
| 5,509,727 | 4/1996 | Hart et al. ................................. 303/3 |
| 5,538,331 | 7/1996 | Kettle, Jr. . |
| 5,564,794 | 10/1996 | Hart ............................................ 303/3 |
| 5,564,795 | 10/1996 | Engle . |
| 5,572,187 | 11/1996 | Williford ................................... 303/3 |
| 5,586,813 | 12/1996 | McKay et al. . |

OTHER PUBLICATIONS

Carlson, Updated Status of AAR Electric Brake Specification, The International Railroad Operating Officers Assoc., 21 pages (Sep. 12, 1995).
Electro-Pneumatic Braking Comes Front and Center, Railway Age, p. 34 (Feb. 1996).
Minimatic Modular Components, Clippard Minimatic Catalog 484, 38 pages (1990).
Rees, et al., The Application of Microprocessor Networks to Braking of Freight Trains, RTD–vol. 10, Rail Transportation, ASME, pp. 1–9 (1995).
Klink, et al., Electronic Air Brakes for Trains, RTD–vol. 10, Rail Transportation, ASME, pp. 23–29 and Figure 1 (1995).
Carlson, Freight Car Computer Controlled Electronic Brake Systems, RTD–vol. 10, Rail Transportation, ASME, pp. 11–22 (1995).
"R–6 Relay Valve," Bendix Service Data, Apr. 1991, 2 pages.

(List continued on next page.)

*Primary Examiner*—Matthew C. Graham
*Attorney, Agent, or Firm*—Lloyd L. Zickert

[57] ABSTRACT

An electronic pneumatic brake system for trains which significantly improves brake cylinder pressure build-up time and facilitates essentially instantaneous and simultaneous braking on all cars of the train. The electronic pneumatic brake system includes electronic pneumatic control valves on the cars which individually control the braking on each car or a pack of cars and which are regulated by an electronic pneumatic controller on each car that receives electronic braking and release signals by way of wireless communication from an electronic head end unit on the lead locomotive, or where no head end unit is provided in the locomotive, receives pneumatic braking signals through the brake pipe.

115 Claims, 12 Drawing Sheets

OTHER PUBLICATIONS

The Car And Locomotive Cyclopedia of American Practices, Section 13 Air Brakes, pp. 359–363 (5th ed. 1984).

E–P Brake Tests: "Like Driving a Sports Car", Railway Age, p. 18 (Oct. 1995).

Carlson, Putting E–P Brakes to the Test, Railway Age, pp. 31–39 (Feb. 1995).

Welty, The Next Big Breakthrough?, Railway Age, pp. 26–31 (Jun. 1994).

EABS TSM Electronic Air Brake System, Technical Service and Marketing, Inc., 25 pages (1995).

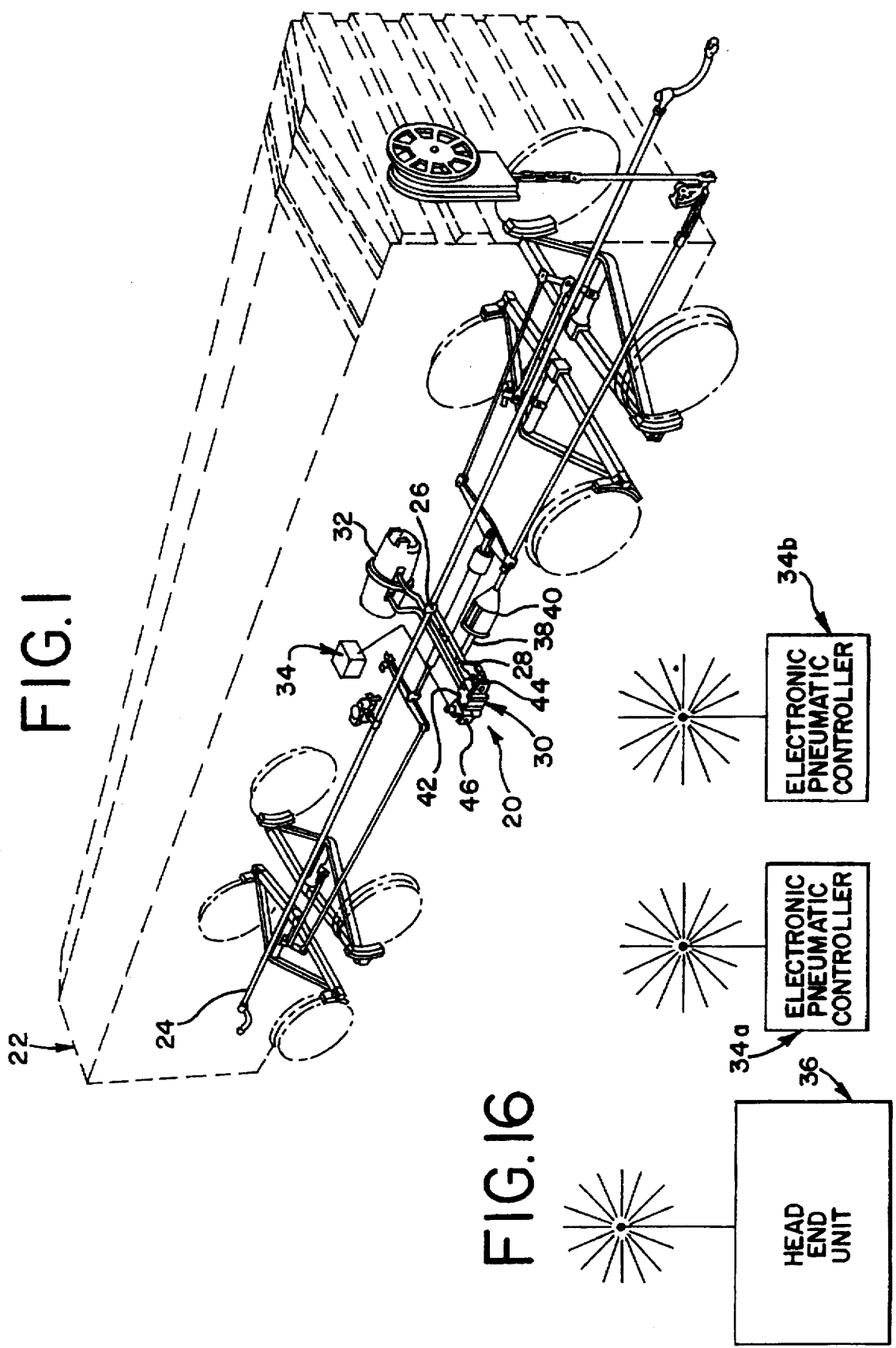

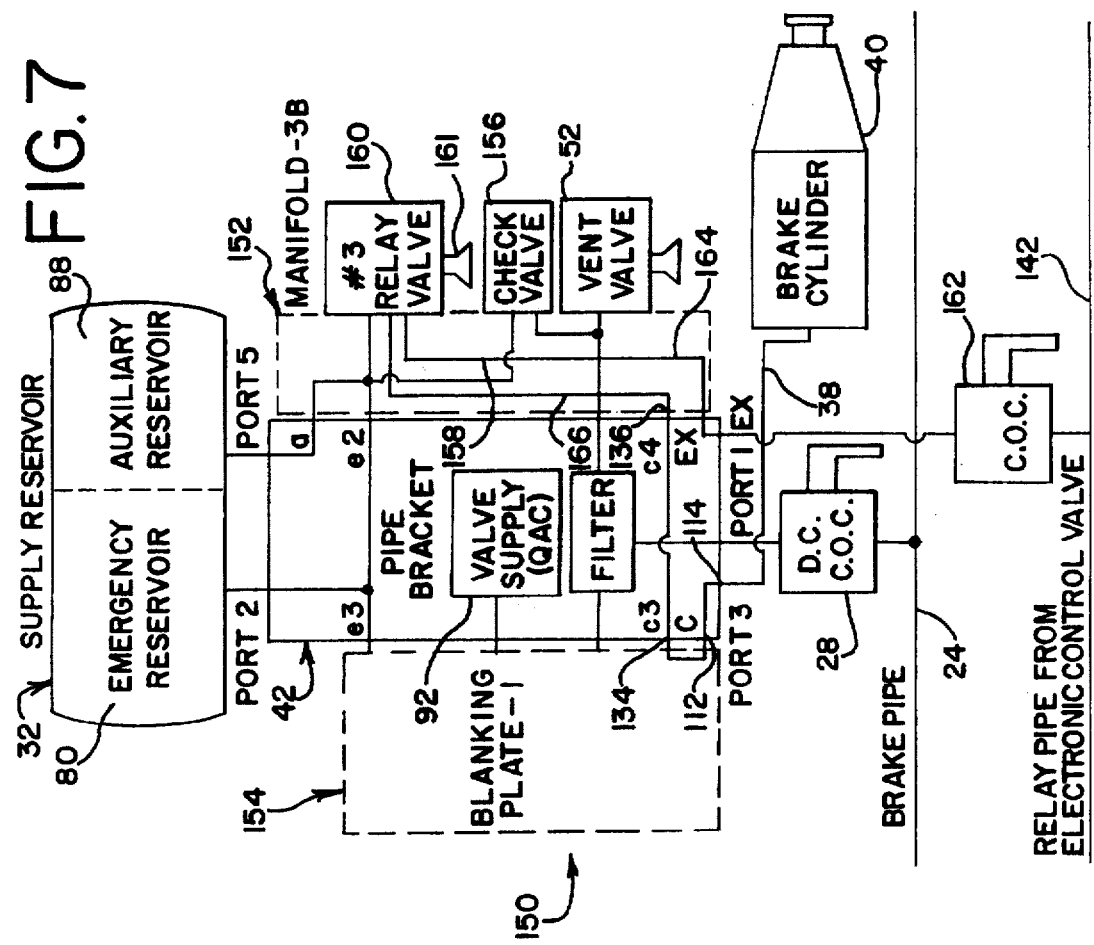
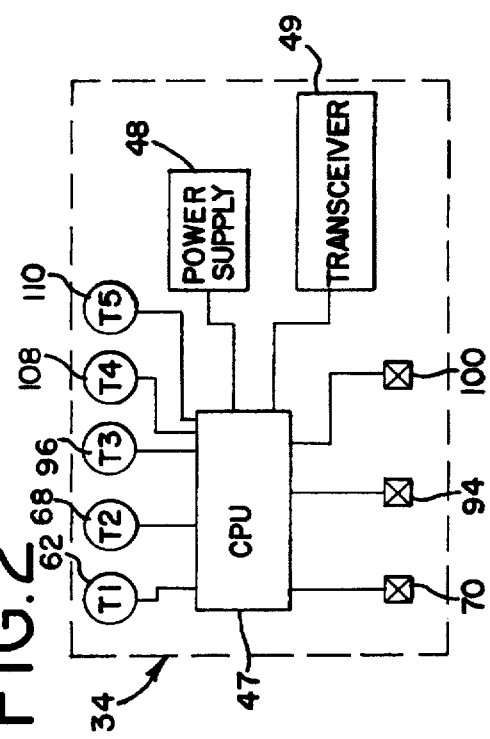
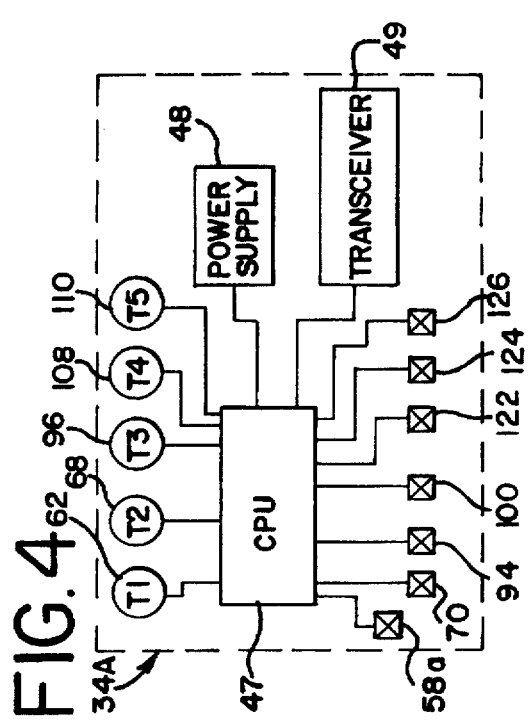

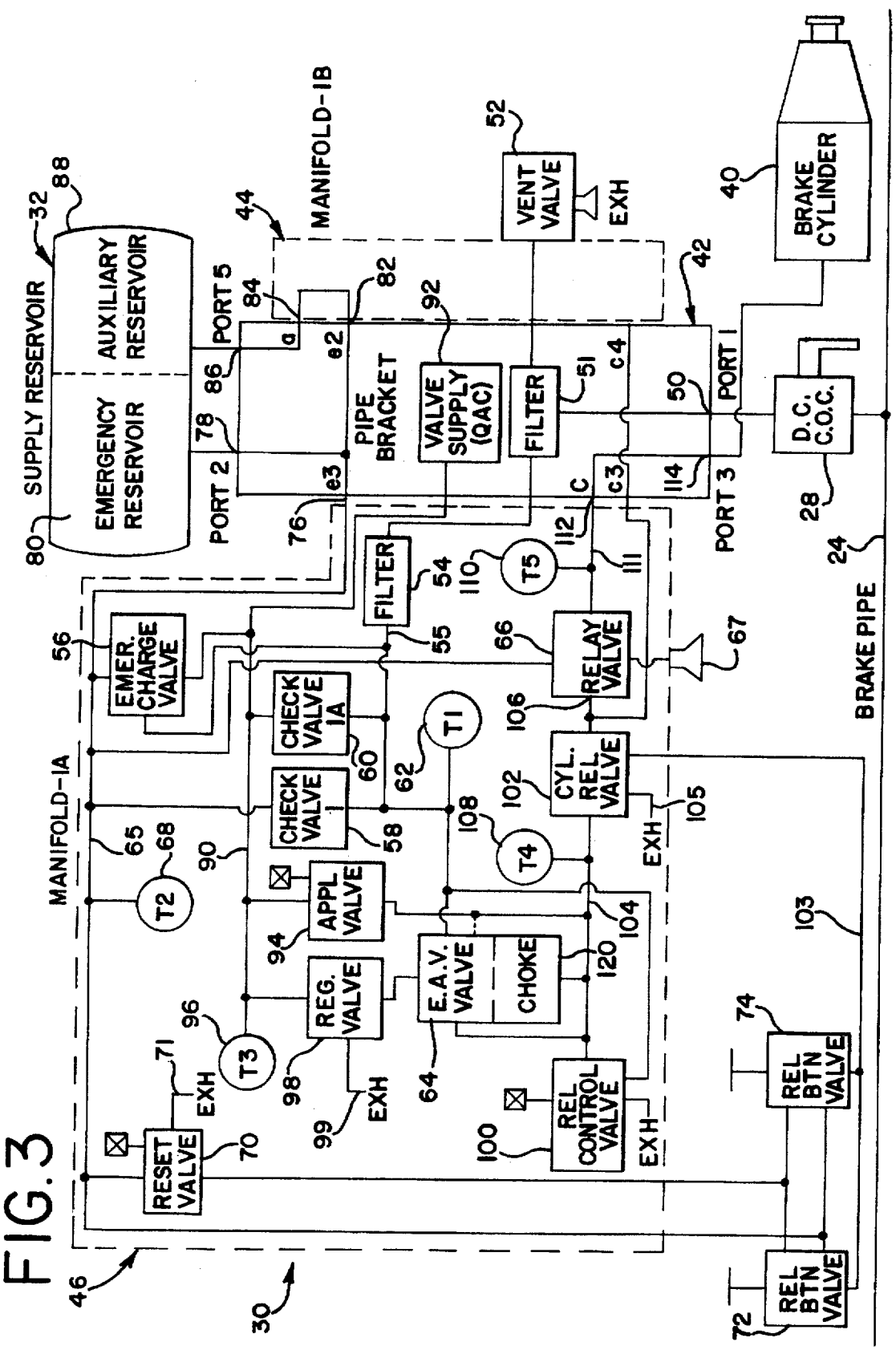

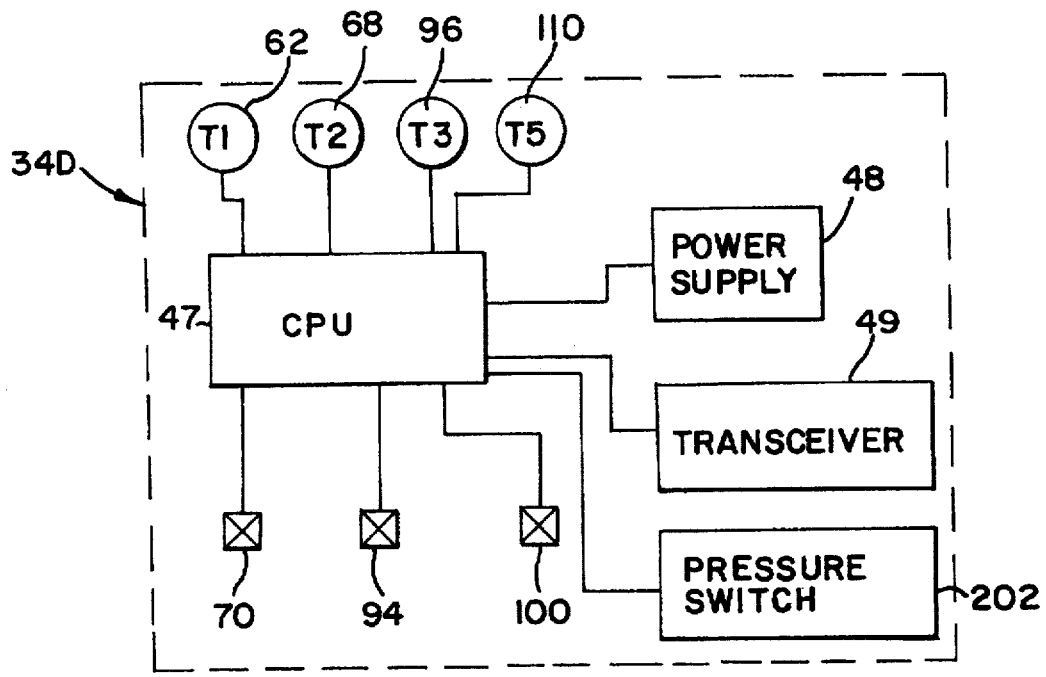
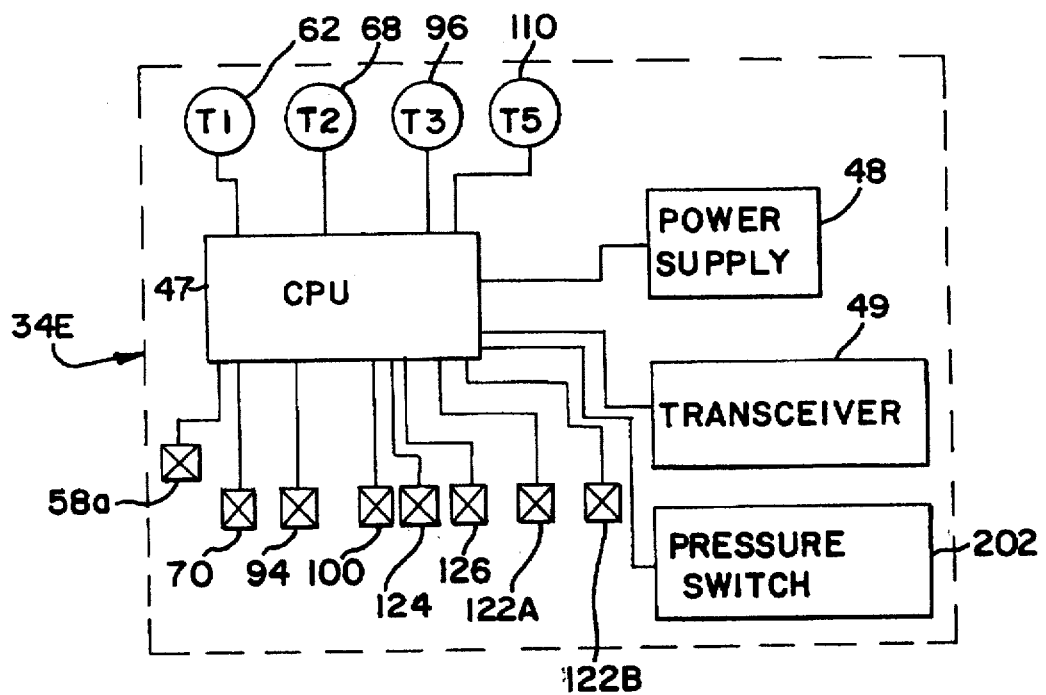

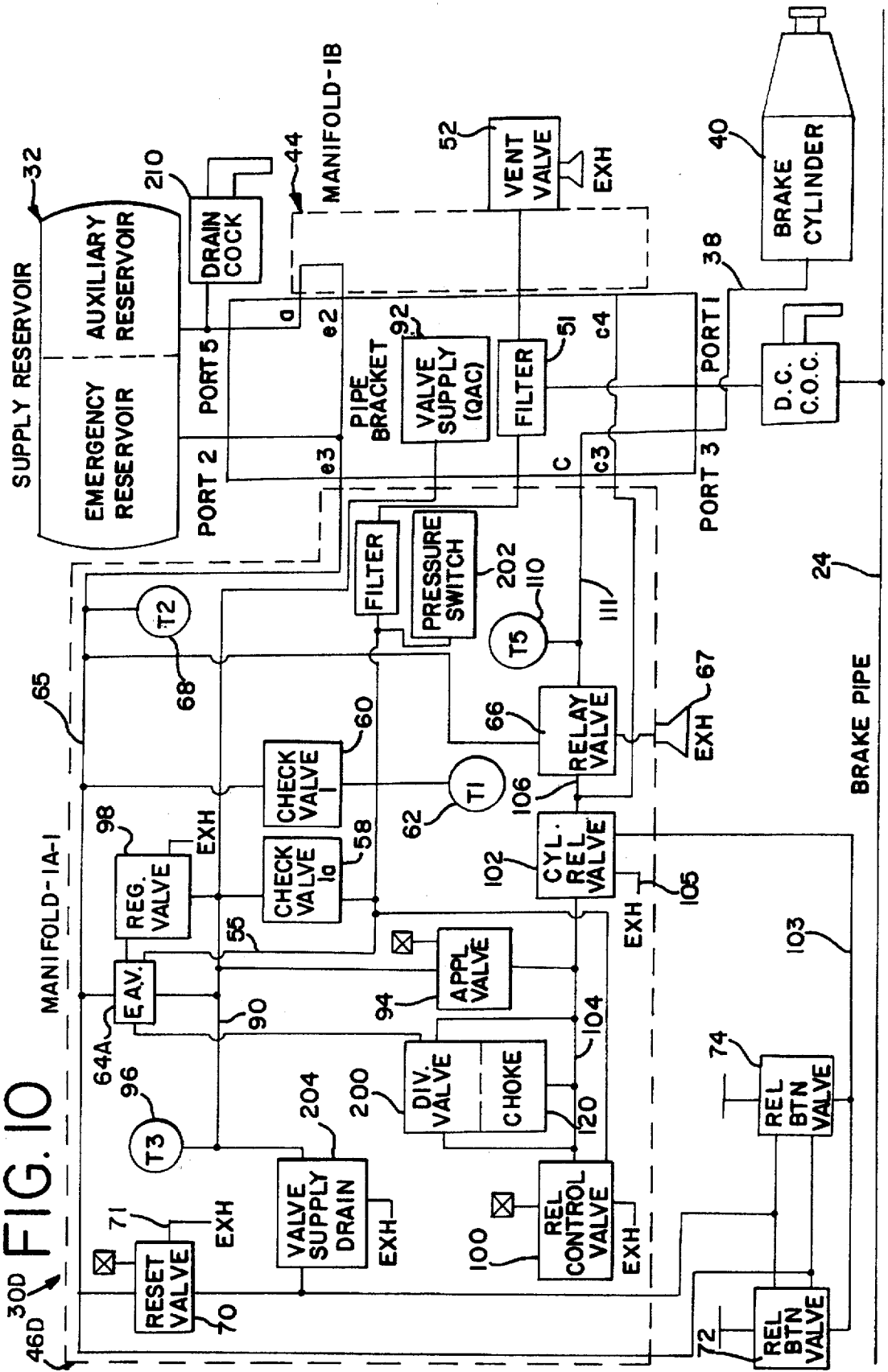

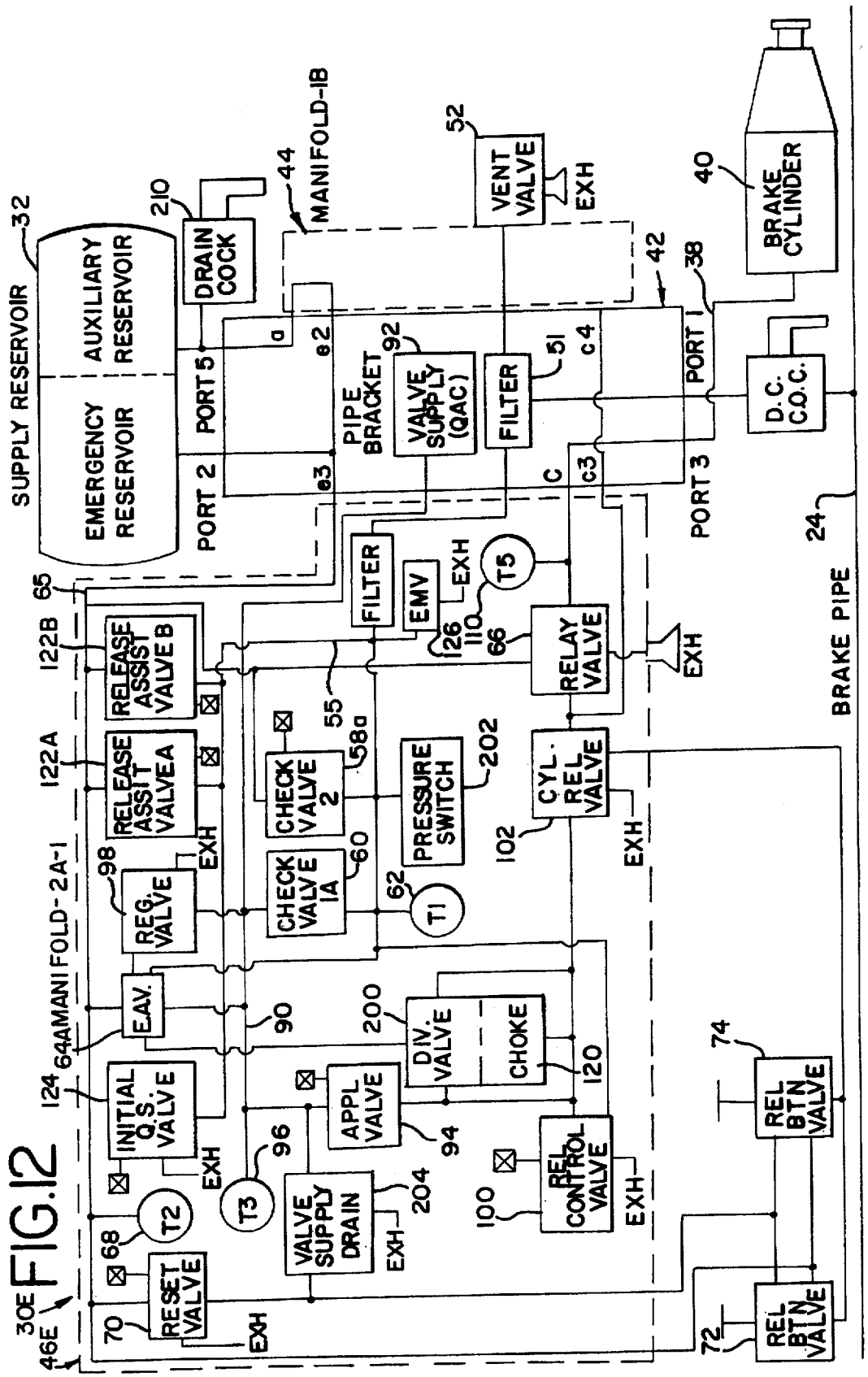

ELECTRONIC PNEUMATIC BRAKE SYSTEM

This application claims the benefit of U.S. provisional application Ser. No. 06/007,808, filed Nov. 30,1995.

This invention relates in general to an electronic pneumatic brake system for trains, and more particularly to a fail-safe electronic pneumatic brake system which provides substantially instantaneous and simultaneous application of the brakes on all of the cars which significantly reduces brake pressure build-up time as well as braking distances.

BACKGROUND OF THE INVENTION

Railroad trains in North America, Europe, and substantial parts of the world are equipped with some form of automatic pneumatic brake systems, sometimes referred to as air brakes. This strictly pneumatic brake system provides a simple, reliable, and generally fail-safe means for permitting the engineer, conductor, or train crew to apply the brakes throughout the train as well on the locomotive. The automatic pneumatic brake system is a continuous power brake system having an air compressor on the locomotive connected to a brake pipe extending throughout the train. An automatic brake valve is located on the locomotive which the engineer uses to reduce or increase air pressure in the brake pipe. The standard automatic brake valve has a release position, an initial reduction position, a service braking zone, a suppression position, a handle off position, and an emergency position. Each car of the train has a control valve which senses a "reduction" or "increase" of air pressure in the brake pipe initiated by the engineer at the automatic brake valve, and applies or releases the brakes according to the "reduction" or "increase" command, respectively. The control valves vary in construction and in operating features to suit freight or passenger trains.

While air brakes are used on both freight and passenger trains, the demands on each system are quite different due to the length of the train, the weight of the train, the speed of the train, and other various factors. The length of the train is especially important since air pressure reductions in the brake pipe travel at approximately the speed of sound. In a long freight train, such as one having one hundred fifty cars and a possible length of one and one-half miles, it takes approximately eighteen seconds for the air pressure reduction initiated in the locomotive to reach the last car in the train. Accordingly, in the prior known automatic pneumatic brake systems on freight trains, the brake cylinder pressure build-up time has to be carefully retarded in the front cars to prevent the last cars of the train, where the brakes have not yet been applied due to the signal delay, from running into the front cars with fully developed brake cylinder pressure. Consequently, full pressure braking is delayed and braking distances are longer. On shorter trains such as passenger trains, this is not such a significant problem, even though there is some delay between the braking of the first and last cars.

To solve these problems, electronically controlled pneumatic brake systems have been proposed and are currently being tested. For example, Technical Services & Marketing, Inc. has proposed and is testing a retrofit electronic air brake system disclosed in U.S. Pat. No. 5,355,974. The electronically controlled pneumatic brake system generally incorporates part of the automatic pneumatic brake system equipment including the brake pipe, the reservoir tanks, the brake cylinder(s), and the rigging or linkage between the brake cylinder and the brakes. Control of the brake cylinder pressure is accomplished through a computer controlled network wherein each car is equipped with a control device and the locomotive is equipped with a head end unit or a master controller. Generally, in the prior known electronically controlled pneumatic brake system, the head end unit determines the amount of brake cylinder pressure and sends a corresponding signal, including the amount of brake cylinder pressure, to each controller. The car control devices act through solenoid controlled valves to fill and exhaust the brake cylinder in response to the electronic brake cylinder pressure signals issued by the head end unit. The brake cylinder pressure on each car is thereby directly controlled by the head end unit in response to an electronic braking or release command from the engineer. The electronically controlled pneumatic brake system provides substantially instantaneous and simultaneous brake signals to all of the cars which enables all of the cars to brake at substantially the same time (i.e., increasing the rate of brake cylinder pressure build-up). The electronically controlled pneumatic brake system also provides the possibility of a graduated release of the brakes since the brake cylinder pressure on each car is under virtually simultaneous control of the engineer. The brakes can be applied, partially released, then reapplied as often as necessary, within the ability of the locomotive air compressors to replenish reservoirs at the rear of a long train.

While the general concept of electronically controlled pneumatic brake systems has been proposed, there currently are no Association of American Railroads (AAR) approved systems which completely, adequately, and safely implement an electronically controlled pneumatic brake system installation on present passenger or freight trains. To foster development of electronic air brake systems, the AAR recently issued a report on electronically controlled pneumatic brake systems entitled "UPDATED STATUS OF AAR ELECTRIC BRAKE SPECIFICATION" to provide general guidelines for the industry in developing electronically controlled pneumatic brake systems according to minimum standards and specifications. Accordingly, there is a need for a fail-safe electronically controlled pneumatic brake system adapted to be installed and work in conjunction with the pneumatic braking rigging or equipment on present day freight cars that completely, adequately, and safely implements an electronically controlled pneumatic brake system and eliminates the problems of the old air brake systems.

SUMMARY OF THE INVENTION

The present invention provides a fail-safe electronic pneumatic brake system for trains, and particularly for freight trains, which significantly reduces brake pressure build-up time and braking distances by providing substantially instantaneous, simultaneous, and uniform application of brakes on all cars in the train. The electronic pneumatic brake system of the present invention further facilitates a substantial increase in braking control, provides a graduated release of the braking application, increases the uniformity of braking which diminishes brake-related damage and extends wheel life, constantly recharges the supply reservoir during normal operation including braking applications, responds to air pressure reductions in the brake pipe as commonly used in freight cars, dramatically reduces brake-induced slack action between the cars, decreases the time spent in charging and testing the system during set-up thereby reducing terminal delays, and works on three-pack or five-pack articulated sets of cars. Additionally, better all-around braking of the train provided by the present invention allows the trains to run faster and more efficiently.

In one embodiment of the electronic pneumatic brake system of the present invention the system includes an electronic head end unit on the lead locomotive, an electronic pneumatic controller on each car or on one car of a three-pack or five-pack articulated set, and an electronic pneumatic control valve on each car or on one car of an articulated set. The head end unit and the controllers may be hard-wired to respond to each other, or fitted with transceivers for responding to each other. The control valve is attachable to the pipe bracket thereby replacing the ABD, ABDW, or other conventional valves on present automatic air brake systems. More particularly, the electronic pneumatic brake system of the present invention is easily installed on cars having the present automatic air brake system equipment by replacing the service and emergency portions of the conventional control valve with service and emergency manifolds, mounting an electronic pneumatic controller on the car, connecting the controller to the electronic pneumatic control valve, removing the release rod and the retainer, mounting release buttons on opposite sides of the car, and connecting the release buttons to the control valve with a suitable air line, such as nylon tubing.

The electronic pneumatic braking system is operated at the head end unit by the engineer on the lead locomotive. After the system is charged, the engineer can initiate braking and the level of braking through the head end unit which sends an electronic braking signal preferably by wireless communication to the controllers on the cars, thereby causing all cars in the train to brake substantially instantaneously, simultaneously, and uniformly. The electronic signal from the head end unit corresponds to the amount of the air pressure reduction in conventional air brake systems, as described below. Each electronic pneumatic controller responds to the braking signal by calculating the brake cylinder pressure for its car and activating the electronic pneumatic control valve to cause an increase in brake cylinder pressure. The engineer can release the brakes using the head end unit which sends a brake release signal preferably by wireless communication to each controller. This signal corresponds to the amount of brake pipe pressure increase in conventional brake systems. Each controller calculates the amount of release and activates the control valve to decrease the brake cylinder pressure and release the brakes. The electronic pneumatic brake system of the present invention further has electronic and pneumatic emergency braking and release applications which back each other up to provide a fail-safe braking system as well as a manual brake release mode.

The present invention thus includes an electronic pneumatic brake system having an electronic controller on each car of the train or on one car of an articulated set which responds to a head end unit on the locomotive. The present invention further includes alternative embodiments of the electronic controller and control valve adapted to respond to air pressure reductions in the brake pipe as commonly used in freight cars if there is no head end unit on the lead locomotive. Specifically, the present invention includes alternative embodiments which include a universal control valve for use with one or more cars on a train with a locomotive having or not having a head end unit, a control valve for use on a center car of three-pack or five-pack articulated sets of cars in a train with a locomotive having a head end unit, and a universal control valve for use on the center car of three-pack or five-pack articulated sets of cars in a train with a locomotive having or not having a head end unit. In articulated car sets, the present invention further includes a non-electronic pneumatic braking unit for use on the additional cars of three-pack or five-pack articulated sets of cars. The system of the present invention is particularly suitable for long freight trains, but could be used on short freight or passenger trains or combination freight and passenger trains.

It is therefore an object of the present invention to provide a unique and failsafe electronic pneumatic brake system for trains.

A further object of the present invention is to provide an electronic pneumatic brake system which provides a more uniform application of the brake throughout the train due to a more precise control of brake pressure and application.

A further object of the present invention is to provide an electronic pneumatic brake system which significantly reduces brake cylinder pressure build-up time and dramatically reduces braking distances.

A further object of the present invention is to provide an electronic pneumatic brake system which provides substantially instantaneous and simultaneous braking on all cars of the train that facilitates a substantial decrease in braking delay.

A still further object of the present invention is to provide an electronic pneumatic brake system which incorporates the service and emergency braking applications into one system.

A further object of the present invention is to provide an electronic pneumatic brake system which is easily installed and which utilizes substantially all of the present automatic air brake system rigging or equipment.

A further object of the present invention is to provide an electronic pneumatic brake system which provides for graduated release of the train brakes.

A further object of the present invention is to provide an electronic pneumatic brake system which constantly recharges the supply reservoir during normal braking conditions.

A still further object of the present invention is to provide an electronic pneumatic brake system which is adapted to respond to air pressure reductions in the brake pipe as commonly used in freight cars.

A yet further object of the present invention is to provide an electronic pneumatic brake system for three-pack or five-pack articulated car sets.

Other objects, features and advantages of the invention will be apparent from the following detailed disclosure, taken in conjunction with the accompanying sheets of drawings, wherein like reference numerals refer to like parts.

DESCRIPTION OF THE DRAWINGS

FIG. 1 is a perspective view of a railroad freight car illustrating the electronic pneumatic braking system of the present invention;

FIG. 2 is a block diagram of the electronic pneumatic controller of the present invention for use on cars in a train with a locomotive having an electronic head end unit;

FIG. 3 is a schematic diagram of the electronic pneumatic control valve of the present invention for use on cars in a train with a locomotive having an electronic head end unit;

FIG. 4 is a block diagram of an alternative embodiment of the electronic pneumatic controller of the present invention for use on the cars in a train with a locomotive having or not having an electronic head end unit;

FIG. 7 is a schematic diagram of the pneumatic braking unit on the additional cars of a three-pack or five-pack articulated set of cars in a train.

FIG. 9 is a block diagram of a further preferred alternative embodiment of the electronic pneumatic controller of FIG. 2 for use on cars in a train with a locomotive having an electronic head end unit;

FIG. 10 is a schematic diagram of a further preferred alternative embodiment of the electronic pneumatic control valve of FIG. 3 for use on cars in a train with a locomotive having an electronic head end unit;

FIG. 11 is a block diagram of a further preferred alternative embodiment of the electronic pneumatic controller of FIG. 4 for use on the cars in a train with a locomotive having or not having an electronic head end unit;

FIG. 12 is a schematic diagram of a further preferred alternative embodiment of the electronic pneumatic control valve of FIG. 5 for use on cars in a train with a locomotive having or not having an electronic head end unit;

FIG. 16 is a block diagram illustrating the wireless communication between the head end unit on a locomotive and the electronic pneumatic controllers on the cars where the head end unit and controllers are fitted with transceivers for communicating with each other.

DESCRIPTION OF THE INVENTION

Figure 5:
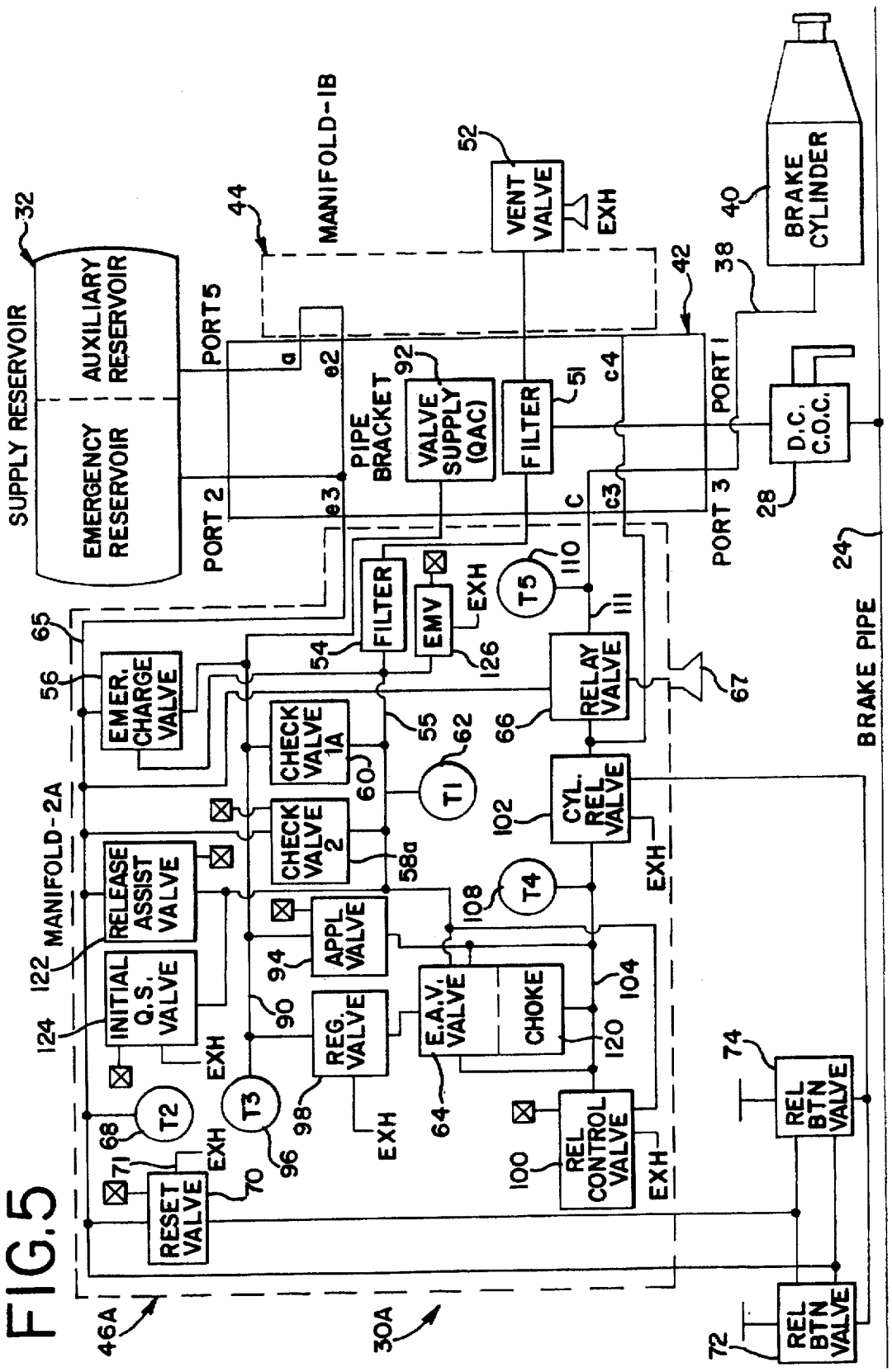
FIG. 5 is a schematic diagram of an alternative embodiment of the electronic pneumatic control valve of the present invention for use on cars in a train with a locomotive having or not having an electronic head end unit.

Referring now to the drawings, and particularly to FIGS. 1 and 16, the electronic pneumatic brake system of the present invention, generally indicated by numeral 20, is adapted for installation on existing freight cars 22 (shown in phantom) and works in conjunction with substantially all of the brake rigging or equipment of the present day automatic air brake system. The electronic pneumatic braking system of the present invention incorporates the brake or supply pipe 24 which runs the length of the train. On each car, the brake pipe 24 is connected at each end to the adjacent car in the train by suitable couplings. The brake pipe 24 distributes compressed air from a compressor (not shown) on the locomotive (not shown) throughout the entire train. In current automatic air brake systems, as well as in the present invention, the air pressure in the brake pipe may range from approximately 70 to 110 psig.

The compressed air travels from the brake pipe 24 through a branch pipe tee 26 in the brake pipe to a combined dirt collector and cut out cock 28 and then to the electronic pneumatic control valve 30 which replaces the conventional valve on present freight cars. The electronic pneumatic control valve 30 directs the compressed air to a supply reservoir 32 which combines the auxiliary and emergency reservoirs of the old brake systems. The supply reservoir stores the compressed air for service as well as emergency braking applications. The control valve 30 is operated by an electronic pneumatic controller 34 mounted on the car. The controller 34 and like controllers on other cars in turn may be operated through radiotelemetry by an electronic head end unit 36 mounted on the lead locomotive or be hardwired to the head end unit. FIG. 16 illustrates the head end unit 36 for a lead locomotive and controllers 34a and 34b for cars in the train, all of which are fitted with transceivers that allow them to communicate with each other. The control valve 30 directs compressed air from the supply reservoir 32 to the brake cylinder 40 in accordance with signals issued by the head end unit 36 to the controller 34 as well as in emergency braking applications. The air pressure directed to the brake cylinder 40 causes the brake cylinder to apply the brakes through a series of linkages in a conventional manner, as generally illustrated in FIG. 1. The brakes may also be applied manually in a conventional manner.

The electronic pneumatic air brake system 20 of the present invention therefore utilizes the components of the old pneumatic braking system except for the addition of the head end unit 36 on the lead locomotive, the addition of an electronic controller 34 on each car, the addition of brake release buttons on each car, the replacement of the current conventional valve with the electronic pneumatic control valve 30 on each car, and the removal of the release rod and retainer from each car. More particularly, the conventional valve includes a standard pipe bracket 42, a service portion (not shown) attached to the service side of the pipe bracket, and an emergency portion (not shown) attached to the emergency side of the pipe bracket. The present invention utilizes the pipe bracket 42, replaces the service portion with a service side manifold 44 attached to the service side of the pipe bracket 42, and replaces the emergency portion with an emergency side manifold 46 attached to the emergency side of the pipe bracket 42. It should therefore be appreciated that the refitting of the cars with the electronic pneumatic brake system of the present invention simply requires removing the old service and emergency portions from the pipe bracket, removing the retainer and release rod, attaching the new manifolds to the pipe bracket, mounting the electronic pneumatic controller on the car, mounting the brake release buttons on opposite sides of the car, connecting the release buttons to the manifold preferably using nylon tubing, and connecting the controller to the pneumatic control valve. A rubber gasket or other suitable gasket is used between the pipe bracket and each manifold to create an airtight connection. A standard freight car can thus be refitted with the electronic pneumatic brake system relatively quickly. This is important since there are approximately 1.2 million freight cars in service in the United States.

The electronic pneumatic air brake system 20 is preferably used on trains controlled by a lead locomotive equipped with an electronic head end unit 36 mounted in the engineer's control panel. The electronic head end unit (HEU), which may feature touch screen control technology, is powered preferably by a separate battery in the locomotive which is constantly recharged by the locomotive and is adapted to send commands to and receive information from the electronic pneumatic controller 34 on each car. More particularly, the head end unit 36 preferably includes a broad-band radio transceiver operating at 2.4 to 2.9 gigahertz or 915 to 919 megahertz which transmits information at two megabytes per second to suitable transceivers on the controllers. These bands are preferable because they have been designated by the FCC for use to transmit data, and do not require a license. Further, this type of radio is essentially jamproof. Alternatively, the transmission between the head end unit and the controllers may be by any wireless method or the head end unit could be hardwired to each controller. The signal from the head end unit to the controllers sent by radio communications to all of the controllers in the train is substantially instantaneous and simultaneous.

During initial set-up or initializing and charging of the system at a terminal, the head end unit establishes communication with each controller and is loaded with the serial number and identification of each car in the train, the weight of the car, and other desirable information. The head end unit and the controllers are also loaded with a security code to prevent random signals from activating the controllers. While each controller hears the HEU transmission, a given controller will not respond unless the correct identification and security code for that car is also received. The given controller is adjusted in accordance with the weight information received by the HEU and transmitted to the controllers during setup for later calculating braking ratios. Thereafter, each controller sets the necessary braking force to match the car weight. Alternatively, each car could be equipped with its own weight-measuring device which provides weight information to the controller on that car.

Figure 6:
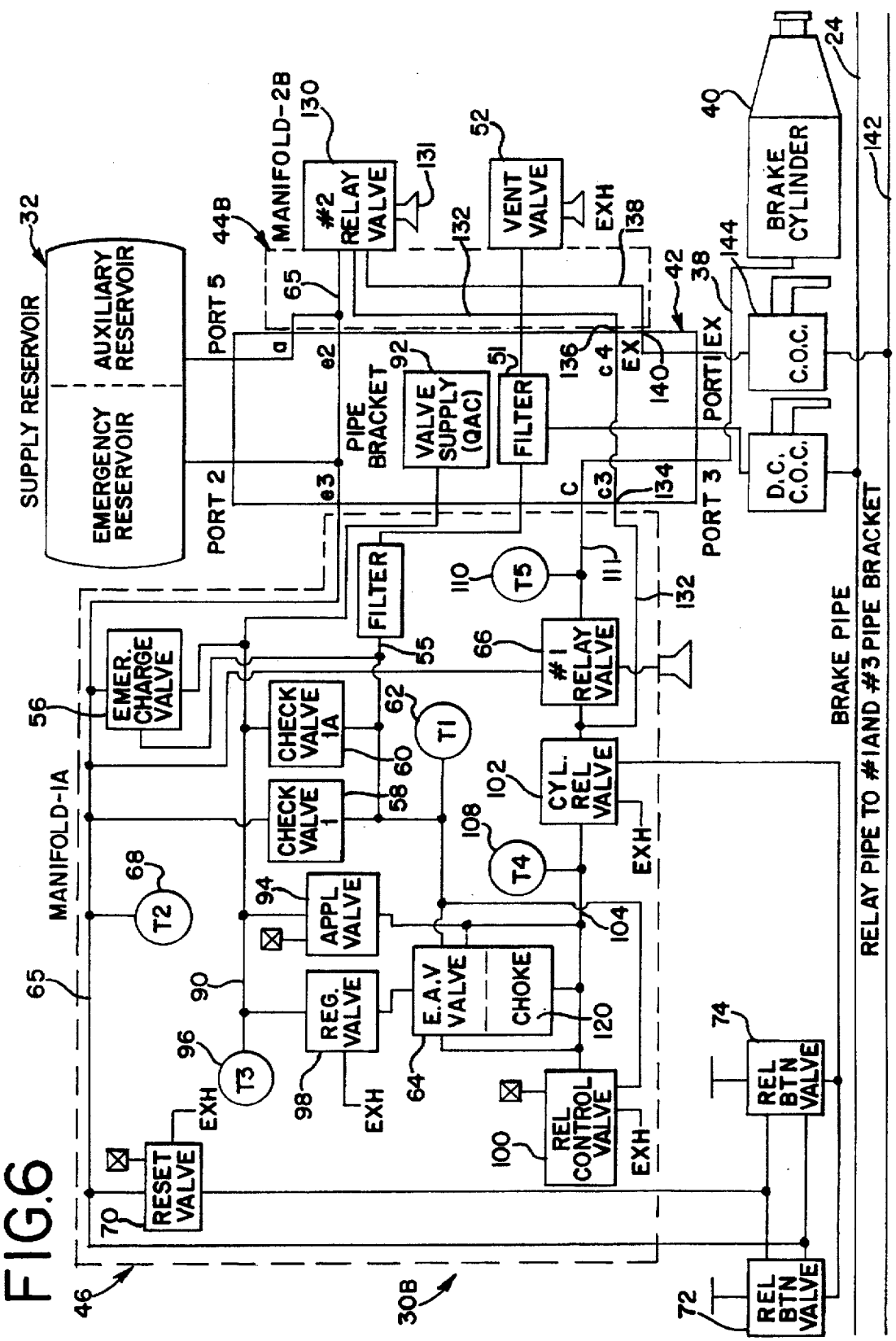
FIG. 6 is a schematic diagram of a further alternative embodiment of the electronic pneumatic control valve of the present invention for use on the center car of a three-pack or five-pack articulated set of cars in a train with a locomotive having an electronic head end unit.
Figure 8:
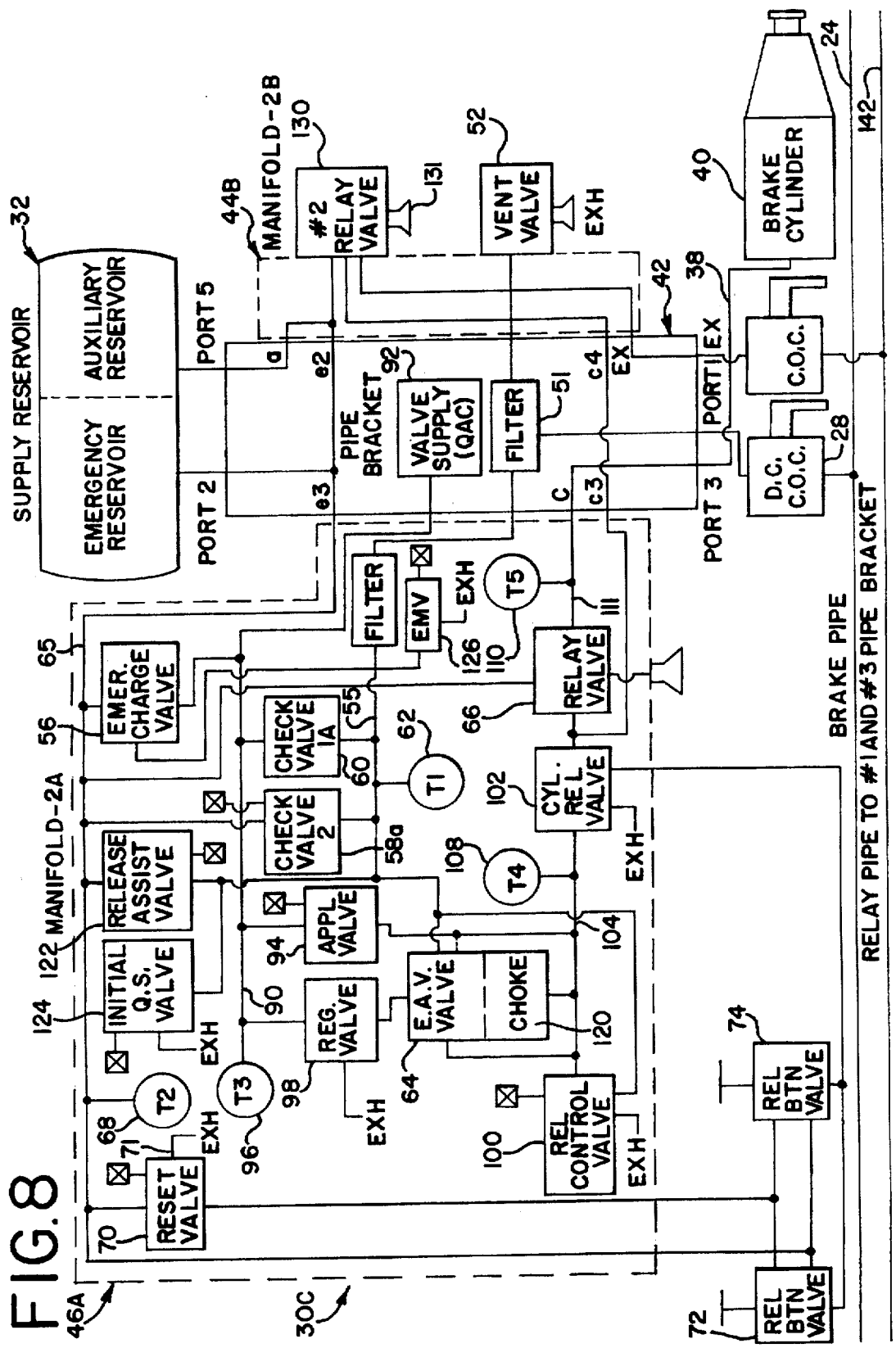
FIG. 8 is a schematic diagram of a further alternative embodiment of the electronic pneumatic control valve of the present invention for use on the center car of a three-pack or five-pack articulated set of cars in a train with a locomotive having or not having an electronic head end unit.
Figure 13:
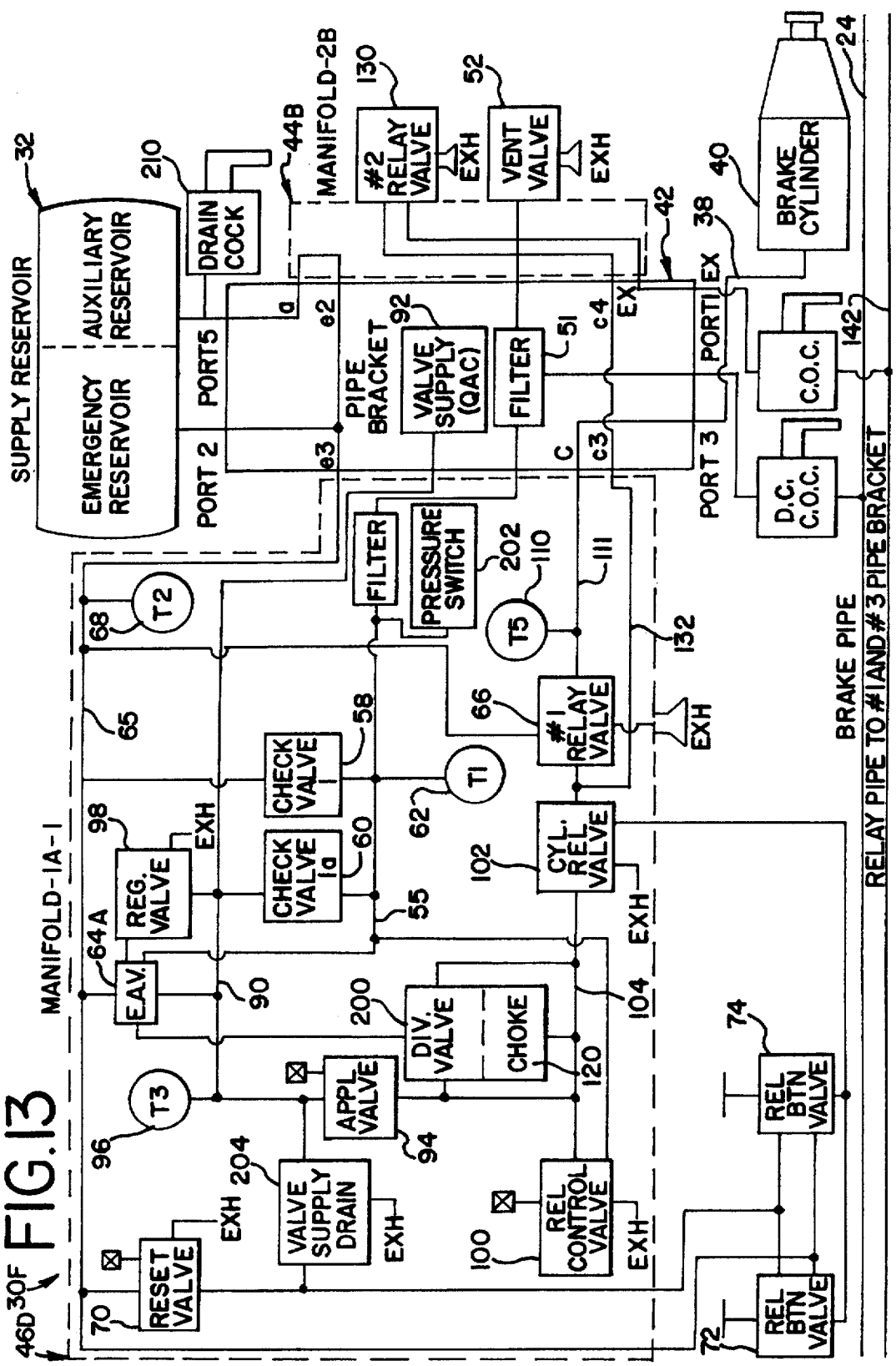
FIG. 13 is a schematic diagram of a further preferred alternative embodiment of the electronic pneumatic control valve of FIG. 6 for use on the center car of a three-pack or five-pack articulated set of cars in a train with a locomotive having an electronic head end unit.
Figure 14:
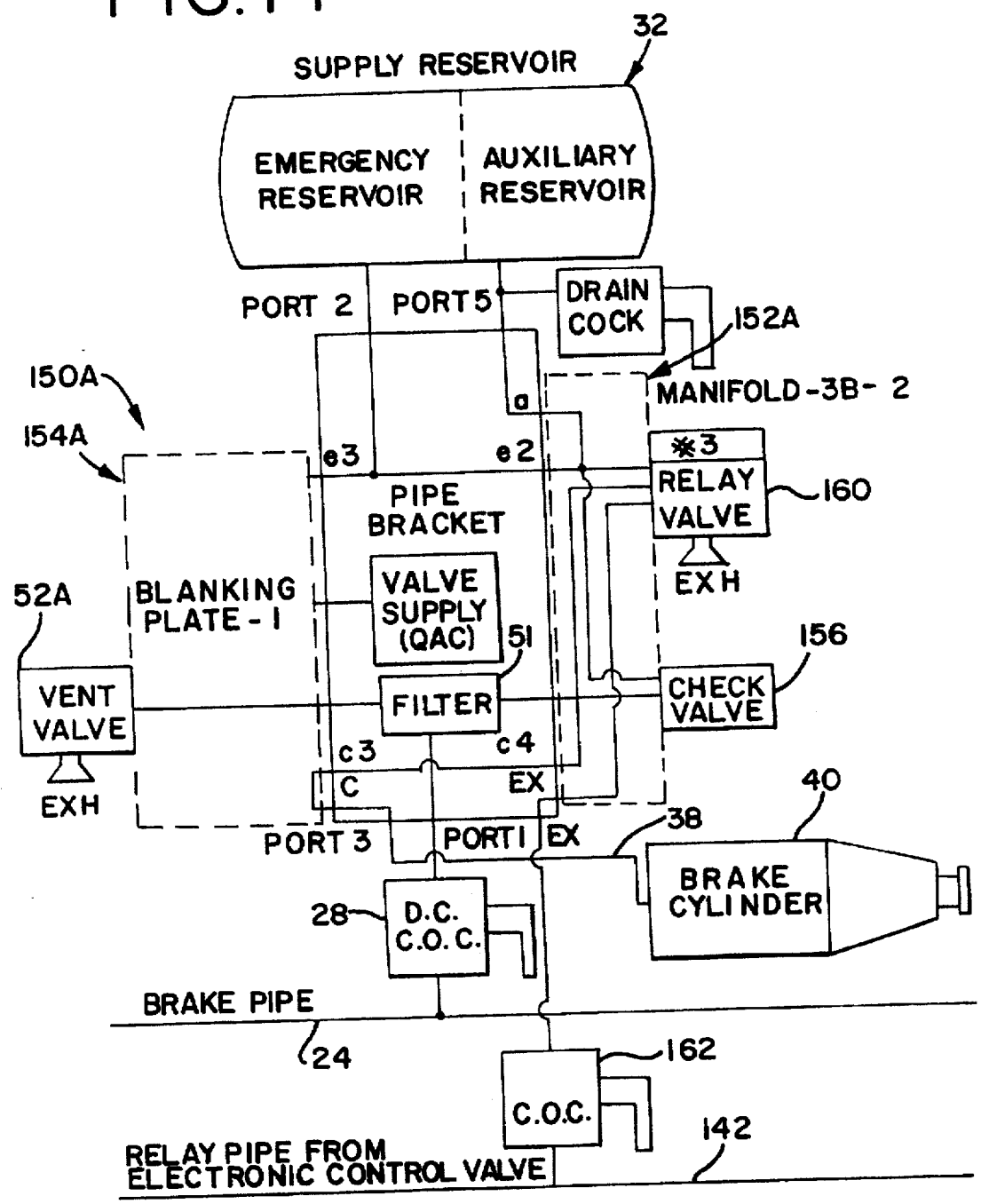
FIG. 14 is a schematic diagram of a further preferred embodiment of the pneumatic braking unit of FIG. 7 on the additional cars of a three-pack or five-pack articulated set of cars in a train.
Figure 15:
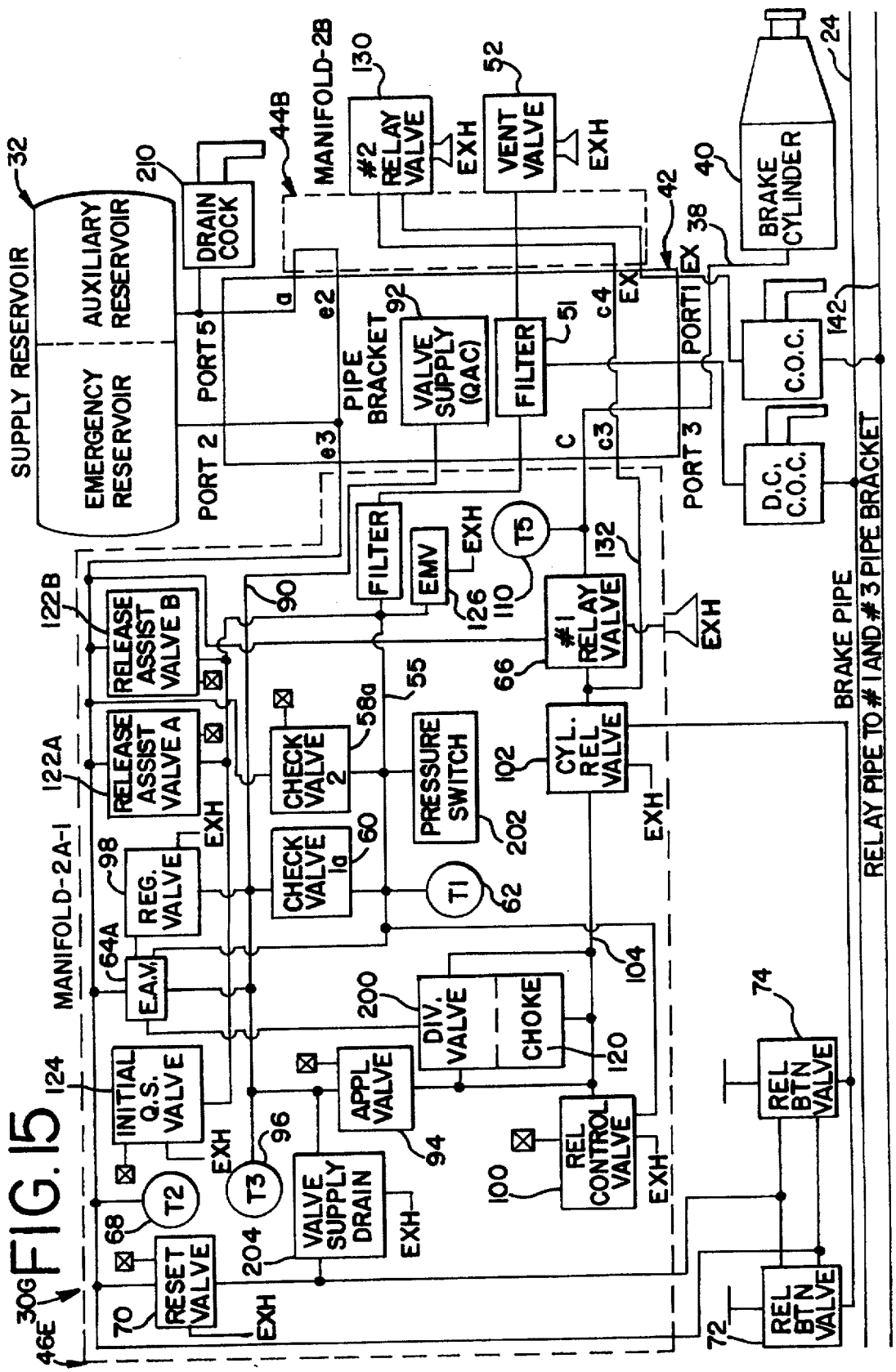
FIG. 15 is a schematic diagram of a further preferred alternative embodiment of the electronic pneumatic control valve of FIG. 8 for use on the center car of a three-pack or five-pack articulated set of cars in a train with a locomotive having or not having an electronic head end unit.

Since not every train will have a head end unit, the electronic pneumatic braking system of the present invention has alternative embodiments which include the combination of electronic controllers and electronic control valves adapted to respond to brake pipe pressure reductions as commonly used in freight cars. While discussed in more detail below, to accomplish this, there are eight different embodiments of the electronic pneumatic control valve and four different embodiments for the electronic controller of the present invention. The eight different embodiments for control valves include: (1) two electronic pneumatic control valves for use on a car in a train with a locomotive having a head end unit, as illustrated in FIGS. 3 and 10; (2) two universal electronic pneumatic control valves for use on a car in a train with a locomotive having or not having a head end unit, as illustrated in FIGS. 5 and 12; (3) two electronic pneumatic control valves for use on the center car of three-pack or five-pack articulated sets of cars in a train with a locomotive having a head end unit, as illustrated in FIGS. 6 and 13; and (4) two universal electronic pneumatic control valves for use on the center or master car of three-pack or five-pack articulated sets of cars on a train with a locomotive having or not having a head end unit, as illustrated in FIGS. 8 and 15. Additionally, the electronic pneumatic brake system of the present invention includes two non-electronic pneumatic braking units for use on the additional or slave cars of three-pack or five-pack articulated sets of cars, as illustrated in FIGS. 7 and 14. The use of these control valves in the electronic pneumatic braking system depends on the make-up of the train and the locomotive to which the cars are connected, as discussed below.

Referring now to FIGS. 1 and 2, the electronic pneumatic controller 34 is suitably mounted on each car preferably close to the pipe bracket and is hardwired by a cable to the electronic pneumatic control valve 30. Each controller has a central processing unit (CPU) or microprocessor 47 which includes a conventional analog to digital converter for converting the analog signals received from the control valve 30 into digital signals which the processor monitors to regulate the control valve. The central processing unit is powered by a power supply 48, preferably consisting of a twelve-volt battery which is charged by an alternator or generator which may be mounted on one of the axles of the car. Other suitable methods of recharging the battery may also be used. The controller has a broad-band radio transceiver 49 operating at 2.4 to 2.9 gigahertz or 915 to 919 megahertz or other suitable band and which can transmit information to the head end unit and other controllers on the train at two megabytes per second. The controller is also connected to a series of transducers and solenoids in the control valve 30, as described below.

The electronic pneumatic brake system of the present invention has multiple stages or applications including an initial set-up and charging stage, a service or braking application, various types of emergency braking applications, braking release applications, an emergency braking release application, and a manual braking release application.

CHARGING

Referring now to FIGS. 2 and 3, the electronic pneumatic control valve 30 and the electronic pneumatic controller 34 are adapted to be used only on trains with a locomotive having a head end unit which communicates with electronic controllers 34 on each of the cars in the train. To charge the system, compressed air from the compressor on the locomotive travels through the automatic brake valve (not shown) in the locomotive and along the brake pipe 24 to each of the cars. In each car, the compressed air travels through the standard dirt collector/cut-out cock 28 and through port 50 (labeled "PORT 1") into the pipe bracket 42. The pipe bracket 42 is the same as is used with current valves and includes four or more ports on each side. The control valve 30 utilizes selected ports, air chambers, and passageways of the pipe bracket. In the pipe bracket 42, the compressed air from the brake pipe passes through a pipe bracket filter 51 and is directed to the service and emergency sides of the pipe bracket. Air at the service side of the pipe bracket 42 travels into a service side manifold 44 (labeled "MANIFOLD-1B") and to a conventional spring biased normally closed vent valve 52. The vent valve 52 is rate sensitive and responds or opens when it detects an emergency pressure decrease in the brake pipe to further vent the brake pipe. During charging, the vent valve 52 is closed, and it remains closed during normal operation. Air at the emergency side of the pipe bracket 42 travels into the emergency side manifold 46 (labeled "MANIFOLD-1A") and through manifold filter 54 and into a supply line 55. Pipe bracket filter 51 is a conventional filter which cleans solid particles such as dirt and pipe scale from the air in the brake pipe. Manifold filter 54 is a porus stainless steel disc filter which additionally filters out solid particles.

After filtering, the compressed air travels in the supply line or passageway 55 to an emergency charge valve 56 (labeled "EMER. CHARGE VALVE"), a check valve 58 (labeled "CHECK VALVE 1"), a check valve 60 (labeled "CHECK VALVE 1A"), a pressure transducer or sensor 62 (labeled "T1"), an emergency assuring valve 64 (labeled "E.A.V. VALVE"), and a release control valve 100 (labeled "REL. CONTROL VALVE"). The emergency charge valve 56 is a normally open conventional spring-biased pressure actuated valve wherein the pressure in the supply line 55 holds the emergency charge valve closed during charging and normal operation. The check valves 58 and 60 are normally closed conventional spring-biased valves, connected on one side to the brake pipe 24 and on the other side to the supply reservoir 32 and valve supply chamber 92 respectively, and which permit the flow of air in only one direction toward the supply reservoir and valve supply chamber 92. The check valves 58 and 60 are opened during charging of the system but will not allow air to flow from the supply reservoir or valve supply chamber to the brake pipe. Thus, these valves are open only when the pressure on the brake pipe side exceeds the pressure on the reservoir and chamber side. The emergency assuring valve 64 is a dual cartridge valve having a conventional spring-biased valve wherein the pressure in the supply line 55 closes the emergency assuring valve during charging of the system and holds it closed in normal operation. The emergency assuring valve 64 also includes a diverter valve for directing the air pressure to the choke 120 during pneumatic emergencies, as discussed below.

The release control valve 100 is a double cartridge unit which includes a brake or supply pipe pressure actuated spring-biased valve cartridge or part and a controller actuated pilot line exhaust valve cartridge or part. These cartridges or parts are connected in series. The pressure actuated valve part may be disposed on either side of the solenoid actuated valve part relative to the exhaust and pilot line. The pilot line exhaust valve is solenoid actuated and held open during charging and brake release to vent the pilot line 104 and closed during braking. The pressure actuated valve is connected to the supply line 55 and thus the brake pipe 24 and is maintained open by the normal air pressure in the brake pipe following charging and during normal operation. Specifically, if the brake pipe pressure is at or substantially at the normal pressure, the pressure actuated valve will be held open by that normal pressure, wherein the solenoid actuated valve part controls the connection of the pilot line to exhaust. The pressure actuated valve closes under spring pressure to block any exhausting of the pilot line during emergency braking caused by a drop in supply pipe pressure. Thus, where the solenoid actuated valve may malfunction due to controller malfunction and open the pilot line to exhaust, the pressure actuated valve part of the release control valve assures braking in an emergency situation where the brake/supply pipe pressure is lost or drops to an emergency level.

The transducer 62 is a conventional analog device which converts air pressure into an analog electric signal. The transducer sends this signal to the central processing unit in the electronic controller 34 which converts the analog signal into a digital signal using a standard analog-to-digital converter. With respect to the transducer 62 and other transducers, it should be appreciated that the analog-to-digital converter may be built into the transducer if desired. The controller therefore monitors the air pressure of the supply line 55 as well as the pressure in the brake pipe 24.

The compressed air flows through check valve 58 into reservoir supply line or passageway 65 and to relay valve 66 (labeled "RELAY VALVE"), emergency charge valve 56, transducer 68 (labeled "T2"), reset valve 70 (labeled "RESET VALVE"), release button-type valves 72 and 74 (labeled "REL BTN"), and port 76 (labeled "e-3") in the pipe bracket 42. The relay valve 66 is a normally closed pressure actuated valve which remains closed during charging and may be spring biased. When the relay valve 66 is in the closed position, the relay valve exhaust 67 is open, thereby venting the brake cylinder 40, as discussed below. The reset valve 70 is a normally closed conventional solenoid actuated valve. The release button-type valves 72 and 74 are provided for trainmen to manually release the brakes on the car. These valves are pressure and manually closable and manually openable mechanical valves physically mounted on opposite sides of the car. The release button valves are closed or in the "out" position during charging of the system and openable by trainmen when manually releasing the braking on the car.

The pipe bracket 42 directs compressed air from a port 76 through a flange fitting port 78 (labeled "PORT 2") at the rear face of the pipe bracket 42 and into an emergency reservoir 80 where the compressed air is stored. The pipe bracket 42 also directs compressed air from port 76 through port 82 (labeled "e2") into manifold 44, which in turn directs the air back into pipe bracket through port 84 (labeled "a"). Thus, ports "e2" and "a" are connected together by Manifold-1B. The pipe bracket further directs the air from port "a" through a flange fitting port 86 (labeled "PORT 5") at the rear face of the pipe bracket and into an auxiliary reservoir 88 where the compressed air is stored. Accordingly, the conventional two-compartment auxiliary and emergency reservoirs that are used on present freight equipment are combined to form the single supply reservoir 32 in the present invention.

The combination of the auxiliary and emergency storage compartments 80 and 88 into one supply reservoir 32 simplifies the system and provides better operation in addition to eliminating the need of the control valve to maintain more than one system. The air stored in the supply reservoir 32 provides compressed air to the relay valve 66 via the reservoir supply line 65 for use in applying the brakes, as described below. The pressure of the air in the supply reservoir 32 is monitored by a transducer 68 which sends a signal to the central processor of the electronic controller 34. The supply reservoir will charge at a rate faster than with previous equipment because of the substantially direct connection between the brake pipe 24 and the supply reservoir 32, but not so fast as to rob the brake pipe and other reservoirs in the train of air. The maximum air pressure in the supply reservoir is equal to the maximum air pressure carried in the brake pipe.

The compressed air also flows through check valve 60 into a pilot supply line or passageway 90 and to the valve supply volume or chamber 92 located in the pipe bracket 42, the emergency charge valve 56, an application valve 94 (labeled "APPL VALVE"), a transducer 96 (labeled "T3") and a regulating valve 98 (labeled "REG. VALVE"). The valve supply volume or chamber 92 is a relatively small air storage chamber in the pipe bracket 42 previously called the quick action chamber or the "QAC". Since the valve supply volume is relatively small, during charging the valve supply volume 92 will immediately fill or build-up to the pressure in the brake pipe 24. The application valve 94 is a solenoid actuated valve which is held closed during system charging. The regulating valve 98 is a normally open conventional spring-biased pressure actuated valve which is manually set at a predetermined pressure level based on conventional air pressure levels and is open during charging and normal operation. If during a pneumatic emergency, the pressure in the pilot line 104 exceeds the predetermined pressure in the regulating valve, the regulating valve exhaust 99 will open, venting the pressure in the pilot line until it is at the regulating valve predetermined pressure level. The valve supply volume air pressure is monitored by transducer 96 which sends a signal to the central processor in the electronic controller 34.

The electronic pneumatic control valve 30 further includes a cylinder release valve 102 (labeled "CYL. REL. VALVE") connected to the pilot line or passageway 104. The cylinder release valve 102 is a normally open spring-biased pressure actuated valve which is open during charging to connect the pilot line 104 between the cylinder release valve 102 and a pilot port 106 on the relay valve 66. The cylinder release valve 102 has an exhaust 105 which is closed when the cylinder release valve 102 is open. The pilot line 104 has a substantially small diameter to allow for a quick build-up of air pressure, as discussed below. A transducer 108 (labeled "T4") monitors the pressure in the pilot line 104 and sends a signal to the central processor unit 47 in the electronic controller 34. A transducer 110 (labeled "T5") monitors the air pressure in the brake cylinder line or passageway 111 which is connected to the brake cylinder pipe 38 and sends a signal to the central processor unit 47 in the electronic controller 34. By monitoring the signals from transducers "T1" to "T5", the electronic pneumatic controller 34 monitors the pressure in the brake pipe, the brake cylinder, and all air passageways in the control valve 30.

During train make-up and charging, and after the brake pipe pressure has increased to about 40 psig, the controller 34 may be programmed to momentarily open the solenoid actuated reset valve 70 to feed compressed air to each release button valves 72 and 74 causing resetting and movement to the closed or "out" positions if not already closed.

The following chart provides a summary of the main valves and their positions during the charging of the electronic pneumatic air brake system with control valve 30.

| VALVE | POSITION |
| --- | --- |
| Vent Valve (52) | CLOSED |
| Emergency Charge Valve (56) | CLOSED |
| Emergency Assuring Valve (64) | CLOSED |
| Relay Valve (66) | CLOSED |
| Relay Valve Exhaust (67) | OPEN |
| Reset Valve (70) | CLOSED |
| Release Button Valves (72, 74) | CLOSED ("OUT" POSITION) |
| Application Valve (94) | CLOSED |
| Regulating Valve (98) | OPEN |
| Regulating Valve Exhaust (99) | CLOSED |
| Release Control Valve (100) | OPEN |
| Cylinder Release Valve (102) | OPEN |
| Cylinder Release Valve Exhaust (105) | CLOSED |

After charging, when the pressure in the brake pipe 24 equals that of the supply reservoir 32, the check valves will close. The relay valve is available from Bendix Brakes, a division of Allied Signal Inc., and the other valves are available from Clippard Instrument Laboratory, Inc. as standard valves or custom-made valves.

SERVICE APPLICATION

To initiate braking, the engineer in the lead locomotive sets the head end unit to the level of braking desired. The head end unit transmits a signal, including the amount of the pressure reduction, to the electronic controller 34 on each car of the train. The signal for a service application from the head end unit corresponds to the air pressure "reduction" in the brake pipe in old air brake systems which the engineer initiates with the automatic brake valve. For instance, if the brake pipe pressure is initially set at 90 psig, the head end unit could send a "80 psig" signal to the controllers which would correspond to a brake pipe pressure reduction of 10 psig in a conventional air brake system, even though the brake pipe pressure does not actually change.

Upon receipt of the electronic braking signal from the head end unit, the controllers 34 will calculate the brake cylinder pressure for each car in reference to the amount of the reduction which corresponds to the level of braking desired, and the weight of the car which is loaded into the controller by the head end unit during set-up and charging. After calculating the brake cylinder pressure needed, the controller 34 first momentarily opens the reset valve 70 directing air pressure to the release button valves 72 and 74 to insure that those valves are closed or in the "out" position. This check occurs each time the engineer increases or decreases the brake application using the head end unit to insure that the brakes throughout the train are available. This protects against situations where the brakes are released by these valves, such as by a trespasser or inadvertently by a trainman. This feature also conserves time during train make-up at initial terminal or during switching movements as manual resetting is eliminated. When the reset valve closes, it will exhaust the air directed toward the release button valves through the reset valve exhaust 71.

The controller 34 then sends a signal to the release control valve 100 causing the solenoid actuated valve therein to close. Since the pressure in the brake pipe remains constant, the pressure actuated valve in the release control valve remains open. The controller simultaneously sends a signal to the solenoid actuated application valve 94 causing the application valve to open. The opening of the application valve sends air pressure from the valve supply volume 92 via the pilot supply line 90 through the application valve to the pilot line to increase the pressure in the pilot line 104 to the pressure calculated by the controller. The pressure in the pilot line rapidly increases because the pilot line has a substantially small diameter. This pressure build-up in the pilot line, which is communicated to the pilot port 106 of the relay valve 66 through the open cylinder release valve 102, pneumatically causes the relay valve 66 to open, thereby directing air pressure from the supply reservoir 32 into the brake cylinder line 111 via the reservoir supply line 65. As the relay valve 66 opens, the relay valve exhaust 67 closes. The air pressure from the supply reservoir develops in the brake cylinder line 111 and through port 112 (labeled "C") in the pipe bracket 42. This pressure travels through the flange fitting at port 114 (labeled "PORT 3") of the pipe bracket and into the brake cylinder pipe 38. The pressure in the brake cylinder pipe 38 thus equals that of the pilot line 104. The pressure in the brake cylinder pipe 38 is communicated to the brake cylinder 48 which applies the brakes in response to the amount of pressure in the pilot line. It should be appreciated that when the air pressure in the valve supply volume is directed to the pilot line and the air pressure in the supply reservoir is directed to the brake cylinder, the check valves will open due to the pressure difference to begin recharging these volumes. The following chart provides a summary of the valve positions during service braking.

| VALVE | POSITION |
| --- | --- |
| Vent Valve (52) | CLOSED |
| Emergency Charge Valve (56) | CLOSED |
| Emergency Assuring Valve (64) | CLOSED |
| Relay Valve (66) | OPEN |
| Relay Valve Exhaust (67) | CLOSED |
| Reset Valve (70) | OPENED (MOMENTARILY) |
| Release Button Valves (72, 74) | CLOSED (OUT) |

-continued

| VALVE | POSITION |
| --- | --- |
| Application Valve (94) | OPEN |
| Regulating Valve (98) | OPEN |
| Regulating Valve Exhaust (99) | CLOSED |
| Release Control Valve (100) | CLOSED |
| Cylinder Release Valve (102) | OPEN |
| Cylinder Release Valve Exhaust (105) | CLOSED |

As the pressure in the pilot line 104 reaches the value set by the controller 34, the controller will close the application valve 94. Likewise, as the pressure in the brake cylinder 40 reaches the pressure in the pilot line 104 which is the pressure set by the controller, the relay valve 66 will assume a lap condition in which the relay valve 66 and the relay valve exhaust 67 are closed, thereby maintaining the pressure to the brake cylinder constant to provide continued braking at that level. The following chart provides a summary of the valves positions when the desired level of braking is achieved and maintained and a lap condition occurs.

| VALVE | POSITION |
| --- | --- |
| Vent Valve (67) | CLOSED |
| Emergency Charge Valve (56) | CLOSED |
| Emergency Assuring Valve (64) | CLOSED |
| Relay Valve (66) | CLOSED ("LAP" CONDITION) |
| Relay Valve Exhaust (67) | CLOSED ("LAP" CONDITION) |
| Reset Valve (70) | CLOSED |
| Release Button Valves (72, 74) | CLOSED (OUT) |
| Application Valve (94) | CLOSED |
| Regulating Valve (98) | OPEN |
| Regulating Valve Exhaust (99) | CLOSED |
| Release Control Valve (100) | CLOSED |
| Cylinder Release Valve (102) | OPEN |
| Cylinder Release Valve Exhaust (105) | CLOSED |

The pressure in pilot line 104 is constantly monitored by transducer T4 to maintain the set pressure within ±1 psig as set by the controller 34. If the pressure in the pilot line drops, the application valve 94 may be reopened to increase the pressure in the pilot line. If the pressure in the pilot line increases, the solenoid actuated valve of the release control valve 100 may be opened to decrease the pressure in the pilot line. Transducer T5 is used to ascertain that the pressure in the brake cylinder line 111 and thus the brake cylinder 40 is within ±1 psig of the pilot line pressure and the set braking pressure. If the brake cylinder pressure for any reason should deviate from the pilot line pressure, the relay valve 66 will open to supply air from the supply reservoir 32 to the brake cylinder 40 to maintain the brake cylinder pressure substantially equal to the pilot line pressure. This level of control is maintained by the electronic controller 34 at the pilot line 104 by the relay valve 66 during all stages of brake applications regardless of the duration of the application and will be maintained against increased piston travel due to brake shoe wear while descending grades. Thus, a more uniform and consistent braking force is achieved than is possible with present standard air brakes on freight equipment due to this precise control of the air pressure to the brake cylinder.

If additional braking is required, the head end unit sends a signal to the electronic controllers throughout the train. For example, if the initial charging brake pipe pressure was 90 psig, and the first braking signal from the head end unit is 80 psig, the next signal from the head end unit may be 75 psig. This command for additional brake cylinder pressure is calculated by the controller 34, and the pressure in the pilot line 104 is increased by opening the application valve 94, thereby repeating the process. The action as described above may be repeated in reference to braking or "reduction" signals up to a full service brake cylinder pressure in proportion to the maximum pressure carried in the brake pipe during initial charging.

It should be appreciated that since there is no actual decrease in the pressure of the brake pipe 24 during normal braking applications, the supply reservoir 32 and the valve supply volume 92 in the control valve are constantly re-charged by the brake pipe through the check valves 58 and 60.

SERVICE RELEASE

To fully release the brakes, the engineer in the lead locomotive sets the electronic head end unit 36 to the appropriate position. The head end unit sends a signal to the controller on each car to release the brakes. The signal to release the brakes from the head end unit corresponds to an air pressure "increase" in the brake pipe as in the old pneumatic systems which the engineer initiates by moving the automatic brake valve to the release position. Using the previous example, the head end unit would send a "90 psig" signal to the controllers to release the brakes. Upon receipt of the brake release signal from the head end unit, the controller 34 will close the application valve 94 if it is not already closed and open the solenoid actuated valve of the release control valve 100 to exhaust the pilot line 104 pressure to atmosphere. As the release control valve 100 is opened and the pressure in the pilot line is vented, the relay valve 66 will return to the closed position, thereby exhausting the brake cylinder pressure by venting the brake cylinder line 111 to the atmosphere through the relay valve exhaust 67. The following chart provides a summary of the valves positions during the full release of braking.

| VALVE | POSITION |
| --- | --- |
| Vent Valve (52) | CLOSED |
| Emergency Charge Valve (56) | CLOSED |
| Emergency Assuring Valve (64) | CLOSED |
| Relay Valve (66) | CLOSED |
| Relay Valve Exhaust (67) | OPEN |
| Reset Valve (70) | CLOSED |
| Release Button Valves (72, 74) | CLOSED (OUT) |
| Application Valve (94) | CLOSED |
| Regulating Valve (98) | OPEN |
| Regulating Valve Exhaust (99) | CLOSED |
| Release Control Valve (100) | OPEN |
| Cylinder Release Valve (102) | OPEN |
| Cylinder Release Valve Exhaust (105) | CLOSED |

If it is desired to release the train's brakes in steps, such as a graduated release, the engineer must accordingly set the head end unit. Again, using the previous example, the engineer could set the head end unit to send an "85 psig" signal. This corresponds to the engineer stopping the "increase" of the brake pipe pressure in the present pneumatic brake systems. This command from the head end unit will be acted upon by the controller by opening and closing the solenoid actuated valve of the release control valve 100 to reduce the pressure in the pilot line 104 to the desired level as sensed by transducer 108. After the solenoid actuated valve of the release control valve closes, the relay valve 66 will exhaust the brake cylinder line air pressure only until the pressure in the brake cylinder line 111 equals the pressure in the pilot line 104. When the pressure in the brake cylinder line 111 equals the pressure in the pilot line 104, the relay valve 66 will again assume a lap condition, thereby maintaining the pressure to the brake cylinder constant to provide continued braking at that level. The brake cylinder 40 will hold at the pressure determined by the controller based upon the command sent by the head end unit. This condition is a pressure maintaining "lap" condition, such that any leakage at the brake cylinder, piping, or increased piston travel caused by brake shoe wear will again be nullified.

The engineer in the locomotive may send braking signals or release signals at his or her discretion. Thus, with the electronic control valve of the present invention, the engineer may roam through various brake cylinder pressures on all cars in the train evenly as terrain or road conditions warrant. Since the supply reservoir 32 and the valve supply volume 92 on the cars are constantly re-charged from the brake pipe 24 during service braking application, there is little danger of running out of air if the brake system use is within normal parameters. If the system is taken outside of the normal parameters causing a dangerously low air pressure in the supply reservoirs throughout the train as sensed by transducer 68, the head end unit is signaled by the controllers that this is occurring, and either a penalty full service braking application or an electronic emergency braking application will take place stopping the train until the condition is corrected. If at any time the brake system on a given car or cars becomes defective, an alarm will sound at the head end unit in the locomotive to warn the engineer. The engineer may electronically cut out the defective brake system or systems without stopping the train until the train reaches a terminal and the defective systems are fixed.

EMERGENCY APPLICATION

Emergency brake applications are available throughout the train at any time via electronic or pneumatic communications, or both. An electronic initiated emergency brake application will occur when the engineer initiates an emergency brake application on the head end unit. In an electronic initiated emergency braking application, the engineer in the lead locomotive sets the head end unit to an emergency braking position and the head end unit sends a signal to the controllers throughout the train that an electronic emergency braking application has been initiated. When the emergency command is sent out by the head end unit, all of the controllers which receive the emergency electronic braking signal will relay this command to the other controllers throughout the train for backup purposes. After receiving the electronic emergency command, the controller will calculate the cylinder brake pressure and momentarily open the reset valve 70 to insure that the release button valves 72 and 74 are closed. The controller will close the solenoid actuated valve of the release control valve 100 and open the application valve 94 to increase the air pressure in the pilot line 104 to an emergency application pressure at an emergency rate. For instance, when the initial charge is 90 psig in the brake pipe, a signal of "0 psig" sent by the head end unit will indicate an emergency braking application. The emergency level air pressure will be communicated to the brake cylinder 40 via the relay valve 66, as described above. The final brake cylinder pressure will be at least approximately twenty percent higher than the pressure available with a full service brake application. The final braking pressure is, of course, dependent upon the charge carried in the brake pipe. The build-up of emergency brake cylinder pressure is applied substantially instantaneously, simultaneously, and uniformly on each car throughout the train. Thus, when there is an electronic emergency application, no staged or staggered brake cylinder build-up is necessary as with known pneumatic air brake systems. Since this emergency braking application is of the electronic initiated type, there is no decrease in the brake pipe pressure, and the brake pipe will not need to be vented to atmosphere. Rather, the brake pipe will be available to constantly replenish the supply reservoir 32 and the valve supply chamber 92 during the emergency braking application. The following chart provides a summary of the valve positions during the electronic initiated emergency braking application.

| VALVE | POSITION |
| --- | --- |
| Vent Valve (52) | CLOSED |
| Emergency Charge Valve (56) | CLOSED |
| Emergency Assuring Valve (64) | CLOSED |
| Relay Valve (66) | OPEN |
| Relay Valve Exhaust (67) | CLOSED |
| Reset Valve (70) | OPENED (MOMENTARILY) |
| Release Button Valves (72, 74) | CLOSED ("OUT" POSITION) |
| Application Valve (94) | OPEN |
| Regulating Valve (98) | OPEN |
| Regulating Valve Exhaust (99) | CLOSED |
| Release Control Valve (100) | CLOSED |
| Cylinder Release Valve (102) | OPEN |
| Cylinder Release Valve Exhaust (105) | CLOSED |

A pneumatic initiated emergency will occur when the engineer physically moves the automatic brake valve to the emergency position which opens the brake pipe and vents the brake pipe to atmosphere or when the conductor, fireman, or head brakeman opens the ¹ ¼ inch conductor's valve, or when a crew member physically opens a conductor's valve on a car of the train, thereby venting the brake pipe to atmosphere. Further, a pneumatic initiated emergency brake application will occur when the train breaks in two, the brake pipe breaks, or a hose bursts.

In a pneumatic initiated emergency braking application, the air pressure in the brake pipe 24 physically reduces at an emergency rate. The first controller 34 which detects this rate of reduction will apply the brake on the car it is monitoring in both an electronic emergency sequence as described above as well as a pneumatic emergency sequence as described below. At the same time, the controller will relay to the other controllers in the train and the head end unit that an emergency braking application is occurring. Once this command is picked up by the other controllers and the head end unit, they will repeat the emergency braking command, thus assuring that all of the controllers in the train receive the command. This will place all of the cars in the train into an electronic emergency braking application mode. This electronic emergency braking application will take place in all the cars in addition to the pneumatic emergency braking application which is communicated by pneumatic means along the brake pipe.

If there is a failure in the electronic communication of the emergency braking system, all of the cars can still receive the emergency braking signal through pneumatic communication. More particularly, the loss of air pressure in the brake pipe 24 at an emergency rate will be detected by the vent valve 52 causing it to open, thereby venting the brake pipe 55 to atmosphere. This venting on each car will further propagate the reduction of air pressure in the brake pipe serially throughout the train.

A pneumatic emergency causes a two-stage braking application. In the first stage, the controller which senses the pressure reduction through transducer 62 will momentarily open the reset valve 70 to connect the supply reservoir to the release button valves 72 and 74 to close these valves if they are open, and close the solenoid actuated pilot line exhaust valve part of the release control valve 100. As the brake pipe pressure vents, the pressure in the supply line 65 will drop at an emergency rate. The emergency rate loss of supply line pressure to the pressure actuated spring-biased valve part of the release control valve 100 will allow the spring to close this valve part and block the pilot line exhaust to assure the pilot line is closed and not venting to atmosphere. Thus, since the pressure actuated valve closes under spring-biasing action, it blocks or renders redundant the solenoid actuated valve and thus provides a failsafe system for closing the release control valve 100 in pneumatic emergency situations where there may be a failure or malfunction of the controller that would open the pilot line exhaust valve part of the release control valve.

The drop in pressure in the supply line will also cause the emergency charge valve 56 to open which connects the supply reservoir 32 to the valve supply chamber 92, thus insuring the maintenance of adequate pressure in chamber 92. The check valves 58 and 60 will close due to the difference in pressure in the supply line 55 as compared to the reservoir supply line 65 and the pilot supply line 90, respectively. The drop in pressure in the supply line 55 and brake pipe 24 will also open the emergency assuring valve 64 which directs air pressure from the regulating valve 98 directly to the pilot line 104. The pressure build-up in pilot line 104 will cause the relay valve 66 to open, thereby closing the relay valve exhaust 67 and allowing pressure build-up in the brake cylinder 40, as discussed above. This first stage of the two-stage air pressure build-up in the pilot line 104 and the brake cylinder occurs in approximately one and one-half seconds.

The following chart provides a summary of the valve positions during this first stage of the pneumatic initiated emergency braking application.

| VALVE | POSITION |
| --- | --- |
| Vent Valve (52) | OPEN |
| Emergency Charge Valve (56) | OPEN |
| Emergency Assuring Valve (64) | OPEN (ONLY TO PILOT LINE) |
| Relay Valve (66) | OPEN |
| Relay Valve Exhaust (67) | CLOSED |
| Reset Valve (70) | OPENED (MOMENTARILY) |
| Release Button Valves (72, 74) | CLOSED ("OUT" POSITION) |
| Application Valve (94) | CLOSED |
| Regulating Valve (98) | OPEN |
| Regulating Valve Exhaust (99) | CLOSED |
| Release Control Valve (100) | |
| Solenoid Pilot Line Exhaust Valve Pressure Actuated | CLOSED |
| Spring-Biased Valve | CLOSED |
| Cylinder Release Valve (102) | OPEN |
| Cylinder Release Valve Exhaust (105) | CLOSED |

After the pilot line pressure builds to 15 psig during the first stage, the second stage of pressure build-up will be initiated. The emergency assuring valve 64, and specifically the diverter valve will sense the pressure build-up of approximately 15 psig in the pilot line which will cause the diverter valve to divert the air pressure through choke 120 instead of directly to the pilot line 104. The remaining pressure will build up at the same rate as with present pneumatic freight equipment. This two-stage build-up is necessary to coincide with present emergency braking application rates and to guard against in-train buffing forces during a pneumatic emergency. While the first stage of this build-up occurs in approximately one and one-half seconds, the second stage of pressure build-up occurs in approximately four and one-half seconds through the choke 120 to the pilot line 104. The following chart provides a summary of the valve positions during the second stage of the pneumatic emergency build-up.

| VALVE | POSITION |
| --- | --- |
| Vent Valve (52) | OPEN |
| Emergency Charge Valve (56) | OPEN |
| Emergency Assuring Valve (64) | OPEN (ONLY TO THE CHOKE) |
| Relay Valve (66) | OPEN |
| Relay Valve Exhaust (67) | CLOSED |
| Reset Valve (70) | CLOSED |
| Release Button Valves (72, 74) | CLOSED ("OUT" POSITION) |
| Application Valve (94) | CLOSED |
| Regulating Valve (98) | OPEN |
| Regulating Valve Exhaust (99) | CLOSED |
| Release Control Valve (100) | CLOSED |
| Release Valve (Pressure) (100) | CLOSED |
| Cylinder Release Valve (102) | OPEN |
| Cylinder Release Valve Exhaust (105) | CLOSED |

The final brake cylinder pressure will be approximately twenty percent higher than is obtained in a full service application. It should be appreciated that during the pneumatic initiated emergency braking application the application valve remains closed to facilitate a two-stage braking process. However, since a pneumatic initiated emergency triggers an electronic emergency except when there is a complete failure of the electronic system, the application valves will be opened by the controllers throughout the train due to the electronic emergency which essentially nullifies the effect of the pneumatic emergency. Only if there is a failure in the electronic braking system will the electronic pneumatic braking system of the present invention rely on the two-stage braking pressure build-up throughout the train to perform the emergency braking.

During any pneumatic emergency braking application, the diverter valve in the emergency assuring valve 64 monitors the pilot line 104. If there is a pressure of 15 psig or greater at the time of the pneumatic emergency application, the first stage as described above will be nullified and the build-up will only take place through the choke. This may occur, for instance, when a service application is in process and the train breaks in two. If the pilot line should overcharge beyond the preset pressure in the regulating valve 98, the excess will exhaust to atmosphere via the regulating valve exhaust 99. The brake cylinder pressure will thus be limited and maintained by the setting of the regulating valve.

During the pneumatic emergency braking application, and until the brake pipe pressure is restored, the emergency charge valve and the emergency assuring valve will remain open. The emergency charge valve connects the supply reservoir to the valve supply volume during a pneumatic emergency application to maintain adequate pressure in the valve supply volume and thus the pilot line which compensates for the brake pipe at atmospheric pressure. Once the brake pipe pressure is restored, the emergency assuring valve and the emergency charge valve will close, cutting off communication to the pilot line and the valve supply volume, respectfully.

As may be observed from the above description, an emergency application may be obtained by electronic or pneumatic initiated paths of communication or both. The pneumatic emergency application backs up the electronic emergency application and assures that if there should be a catastrophic failure of the controllers throughout the train, an emergency braking application would still occur. That is, even if the electronic emergency braking application initiated at the head end unit did not work, actuation of the automatic brake valve to the emergency position or the opening of the conductor's valve could be used to stop the train in an emergency situation. Additionally, the electronic system backs up the pneumatic system because an electronic emergency is initiated once a pneumatic initiated emergency is detected. Thus, the failsafe condition that has been built into former and present day air brake freight equipment, including the ability to stop the train in the shortest possible time and distance automatically, is assured.

RELEASE FROM EMERGENCY

If the emergency braking application was initiated from the head end unit, the engineer must first move the automatic brake valve to the suppression position and then to the release position in order to release the brakes. The head end unit will then allow the engineer to disengage the emergency braking activation switch on the head end unit which signals the controller to reduce the train to a full service braking application. If the emergency was initiated by a break in the train or brake pipe, the automatic brake valve on the locomotive must be moved to the emergency position and then to the release position in order to re-set the system. If the emergency application was initiated due to manual operation of the conductor's valve, then the brake valve must be moved to the emergency position if it is not already there and then moved to the release position to reset the system including the head end unit and the locomotive brake valve equipment. Once the head end unit and locomotive equipment have been reset, each of the controllers will also be reset. The controller reset will be indicated by the brake cylinder pressure on each car reducing to a full service application value and, once this is achieved, the controllers will assume a lap condition. No matter which type of emergency application initiated the current brake condition, the final release must be made via the head end unit when the controller is in an all electronic train. The remainder of the emergency release is accomplished as described under service braking release.

MANUAL RELEASE OF THE BRAKE APPLICATION

If it is desired to manually release a brake application without the use of the controller, as in switching movements, either release button valves 72 or 74 may be opened by manually pushing in the button. This action will direct the air pressure in the supply reservoir 32 through the release button valve(s) and into the cylinder release supply line 103 to the cylinder release valve 102 causing the pressure activated cylinder release valve 102 to close and the cylinder release valve exhaust 105 to open. This cuts off the connection between the pilot line 104 and the relay valve 66 and vents to atmosphere the air pressure in the pilot line 104 between the cylinder release valve 102 and the relay valve 66. This line will exhaust rapidly from the cylinder release valve exhaust 105. As this section of the pilot line 104 loses air pressure, the relay valve 66 will close and the relay valve exhaust 67 will open, thereby causing the brake cylinder 40 pressure as developed by the relay valve 66 to exhaust at a rapid rate though the relay valve exhaust 67. Air pressure that was developed from the previous braking application will remain in the pilot line 104 between the cylinder release valve 102 and the application valve 94 or the emergency assuring valve 64. The following chart provides a summary of the valve positions during the manual release of braking, assuming the braking was non-emergency.

| VALVE | POSITION |
|---|---|
| Vent Valve (52) | CLOSED |
| Emergency Charge Valve (56) | CLOSED |
| Emergency Assuring Valve (64) | CLOSED |
| Relay Valve (66) | CLOSED |
| Relay Valve Exhaust (67) | OPEN |
| Reset Valve (70) | CLOSED |
| Release Button Valves (72, 74) | OPEN ("IN" POSITION) |
| Application Valve (94) | CLOSED |
| Regulating Valve (98) | OPEN |
| Regulating Valve Exhaust (99) | CLOSED |
| Release Control Valve (100) | CLOSED |
| Cylinder Release Valve (102) | CLOSED |
| Cylinder Release Valve Exhaust (105) | OPEN |

The brakes on the car may be re-applied, if so desired, by closing the release button valve(s) by manually pulling the release button(s) "out" As this occurs, the cylinder release valve 102 will open and the cylinder release valve exhaust 105 will close, thus reconnecting the pilot line 104 with the relay valve 66, causing the relay valve to open and to develop brake cylinder pressure. This feature will allow brake cylinder pressure to be applied or released a number of additional times so as to allow adjustment to brake rigging or facilitate replacement of brake shoes.

If the release button valves 72 and 74 are manually actuated and left in the open or "in" position, the brake will remain released. During train make-up, and after the brake pipe pressure has increased to a predetermined pressure, the controller 34 will reset the release button valves automatically by applying pressure from the solenoid actuated reset valve 70 to each release button valve pilot port to close the valves button. The action as described above of applying air to open the release button valves will also occur each time the engineer brakes or releases the brakes when using the head end unit at the lead locomotive. This feature will insure brakes throughout the train are available in the event that a brake or brakes are released. This feature also conserves time during train make-up at an initial terminal or during switching movements especially because all of the buttons may be closed from the head end unit.

Referring now to FIGS. 4 and 5, an alternative embodiment of the present invention is shown which includes a control valve 30A operated by an electronic controller 34A and adapted to be used on electronic trains (i.e., with a head end unit) as well as conventional trains (i.e., without a head end unit). If a head end unit is detected during train set-up, the universal electronic pneumatic control valve 30A and the electronic pneumatic controller 34A will charge the system, provide service and emergency braking applications, and service and emergency release application exactly like the electronic pneumatic control valve 30 and the electronic pneumatic controller 34. If no head end unit is detected during train set-up, the universal electronic pneumatic control valve 30A and the electronic pneumatic controller 34A on each car will only respond to physical air pressure reductions and increases in the brake pipe as commonly used in the present freight car pneumatic brake equipment. Where there is no head end unit, the controller 34A detects the amount of the pressure reduction and calculates the amount of brake cylinder pressure needed for braking.

The universal electronic pneumatic control valve 34A used on trains without a head end unit provides an improvement in braking pressure buildup time. Even though there is no head end unit, when the first controller detects a reduction in pressure in the brake pipe indicating the desired braking of the train, the controller will cause the control valve 34A to assist in the propagation of this brake pipe reduction, as described below. Thus, the controller 34A reduces transmission time in the service braking application. Likewise, when the first controller detects an increase in pressure in the brake pipe indicating the desired release of braking of the train, the controller will cause the control valve 34A to propagate this brake pipe pressure increase by way of the brake pipe throughout the train. Thus, the controller and control valve reduce transmission time in the service release of braking application. However, in the conventional mode, only direct braking release is available, as opposed to graduated release.

More specifically, the electronic pneumatic control valve 30A uses the service side manifold 44 of control valve 30 and replaces emergency side manifold 46 with manifold 46A (labeled "MANIFOLD-2A"). Manifold 46A has the same configuration as manifold 46, except that it includes a charge control check valve 58a (labeled "CHECK VALVE 2"), a solenoid actuated release assist valve 122, a solenoid actuated initial quick service valve 124, and a solenoid actuated emergency magnet valve 126, all connected to the supply line 55. The release assist valve 122 connects the supply reservoir 32 to the brake pipe 24 via the reservoir supply line 65 and the supply line 55. The initial quick service valve 124 and the emergency magnet valve 126 each include an exhaust port for releasing air pressure in the supply line. The charge control check valve 58a differs from the check valve 58 in that it is a dual cartridge valve with an additional valve which is normally open and which may be actuated by a solenoid to reduce the charging rate of the supply reservoir in a conventional train or to cut off charging when a reduction of brake pipe pressure is detected.

CHARGING

To charge the system with the electronic pneumatic control valve 30A, the compressed air in the brake pipe 24 travels through the dirt collector/cut-out cock 28, into the pipe bracket 42, and is directed to the service and emergency sides of the pipe bracket. Air at the service side of the pipe bracket 42 travels into manifold 44 and to the vent valve 52 which is closed and remains closed during normal operation, except as described below. Air at the emergency side of the pipe bracket 42 travels into manifold 46A, through manifold filter 54, into the supply line 55 and to emergency charge valve 56, charge control check valve 58a, check valve 60, transducer 62, and emergency assuring valve 64, and the release control valve as in the embodiment of FIG. 3. The compressed air also travels through the supply line to the release assist valve 122, the initial quick service valve 124, and the emergency magnet valve 126. The release assist valve 122 is a normally closed conventional solenoid actuated valve which is closed during charging. Similarly, the initial quick service valve 124 and the emergency magnet valve 126 are normally closed conventional solenoid actuated valves which are closed during charging. These valves are available from Clippard Instrument Laboratory, Inc.

The compressed air flows through open check valve 58a through reservoir supply line 65 to relay valve 66, emergency charge valve 56, transducer 68, reset valve 70, release button valves 72 and 74, and to the supply reservoir via ports "e3", "2", "e2", "a", and "5". Additionally, air in the reservoir supply line 65 will be directed to the closed release assist valve 122. If no head end unit is detected by the controller 34A, the controller will reduce and modulate the charging rate of the supply reservoir through charge control check valve 58a to that of the present freight brake equipment so as to facilitate substantially equal charging of the systems in the train. The maximum pressure in the supply reservoir is equal to the maximum pressure carried in the brake pipe. The compressed air also flows through check valve 60 to the pilot supply line 90 and to the valve supply volume or chamber 92, the emergency charge valve 56, the application valve 94, the transducer 96, and the regulating valve 98.

The electronic pneumatic valve 30A also includes a cylinder release valve 102 attached to a pilot line 104. The transducer 108 monitors the pressure in the pilot line 104, the transducer 110 monitors the air pressure in the brake cylinder line 111 and brake cylinder pipe 38. The following chart provides a summary of the valves and their position during the charging of the universal electronic pneumatic control valve 30A.

| VALVE | POSITION |
|---|---|
| Vent Valve (52) | CLOSED |
| Emergency Charge Valve (56) | CLOSED |
| Charge Control Check Valve 1 (58a) | OPEN (modulated where no HEU) |
| Check Valve 1A (60) | OPEN |
| Emergency Assuring Valve (64) | CLOSED |
| Relay Valve (66) | CLOSED |
| Relay Valve Exhaust (67) | OPEN |
| Reset Valve (70) | OPEN (MOMENTARILY) |
| Release Button Valves (72, 74) | CLOSED ("OUT" POSITION) |
| Application Valve (94) | CLOSED |
| Regulating Valve (98) | OPEN |
| Regulating Valve Exhaust (99) | CLOSED |
| Release Control Valve (100) | OPEN |
| Cylinder Release Valve (102) | OPEN |
| Cylinder Release Valve Exhaust (105) | CLOSED |
| Release Assist Valve (122) | CLOSED |
| Initial Quick Service Valve (124) | CLOSED |
| Emergency Magnet Valve (126) | CLOSED |

If there is a head end unit on the lead locomotive, then all applications on the electronic pneumatic control valve 30A are the same as on valve 30. If no head end unit is detected, the service, release, emergency, and emergency release applications are controlled pneumatically, as described below.

SERVICE APPLICATION

To initiate service braking, the engineer in the lead locomotive moves the automatic brake valve into the initial service zone to reduce the air pressure in the brake pipe. When a reduction of the air pressure in the brake pipe reaches the supply line 55, charge control check valve 58a and check valve 60 close, cutting off all charging of the supply reservoir 32 and valve supply chamber 92. This reduction is detected by controller 34A, and controller 34A opens the initial quick service valve 124 to vent additional brake pipe pressure aiding in the reduction of the brake pipe pressure locally at the car, and serially propagating the reduction through the train. The controller 34A will calculate the level of pilot line pressure in relation to the amount of the brake pipe reduction as in controller 34, open the reset valve 70 momentarily, close the solenoid actuated valve of the release control valve 100, and open the application valve 94. As the pressure in the pilot line 104 increases, the relay valve 66 will open and develop brake cylinder pressure equal to that of the pilot line, as described above. It should be appreciated that the controller 34A receives the pneumatic braking signal and calculates the brake cylinder pressure just like the controller 34 which receives an electronic braking signal. The following chart provides a summary of the valve positions during service braking.

| VALVE | POSITION |
| --- | --- |
| Vent Valve (52) | CLOSED |
| Emergency Charge Valve (56) | CLOSED |
| Charge Control Check Valve 1 (58a) | CLOSED |
| Check Valve 1A (60) | CLOSED |
| Emergency Assuring Valve (64) | CLOSED |
| Relay Valve (66) | OPEN |
| Relay Valve Exhaust (67) | CLOSED |
| Reset Valve (70) | OPENED (MOMENTARILY) |
| Release Button Valves (72, 74) | CLOSED ("OUT" POSITION) |
| Application Valve (94) | OPEN |
| Regulating Valve (98) | OPEN |
| Regulating Valve Exhaust (99) | CLOSED |
| Release Control Valve (100) | CLOSED |
| Cylinder Release Valve (102) | OPEN |
| Cylinder Release Valve Exhaust (105) | CLOSED |
| Release Assist Valve (122) | CLOSED |
| Initial Quick Service Valve (124) | OPEN |
| Emergency Magnet Valve (126) | CLOSED |

As the brake pipe reduction ceases and the pressure in the brake pipe levels out, the controller 34A will close the initial quick service valve 124 to stop the further propagation of the reduction signal throughout the train. As the pressure in the brake cylinder 40 reaches the value in the pilot line 104, the relay valve 66 will cease increasing the brake cylinder pressure and assume a lap condition as in control valve 30. The controller 34A and the electronic pneumatic control valve 30A monitor the brake cylinder pressure to maintain the brakes, also as in control valve 30.

If additional braking force is desired, the engineer must again reduce the brake pipe pressure using the automatic brake valve. The propagation of this reduction using the initial quick service valve 124 as described above will be repeated in reference to the additional reduction up to a full service brake application in proportion to the maximum pressure carried in the brake pipe during charging. With each additional reduction, the controller will open the solenoid actuated initial quick service valve to provide an additional path of exhaust for brake pipe pressure to propagate the reduction back through the train. As stated above, all other aspects of the service braking application are the same as in valve 30. Likewise, the operation of the controller 34A is the same except that it also regulates the initial quick service valve 124.

SERVICE RELEASE AND RELEASE ASSISTING

To release the brakes in the embodiment of FIGS. 4 and 5, the engineer must increase air pressure in the brake pipe by moving the automatic brake valve to the release position. Release of the brakes will begin when the controller 34A detects an increase in brake pipe pressure via transducer 62 wherein the brake pipe pressure is greater than the air pressure in the supply reservoir as measured by transducer 68. Once this differential is detected, the controller 34A will close the application valve 94, if it is not already closed, and open the solenoid-actuated valve of the release control valve 100 to exhaust the pilot line 104 to the atmosphere which will actuate the relay valve 66 to close communication between the supply reservoir and the brake cylinder. The relay valve exhaust 67 will open to exhaust the air pressure in the brake cylinder line 111, and the brake cylinder pressure will be reduced as in the service release of control valve 30.

When the controller 34A starts the release cycle by opening the release control valve 100, the controller will also open the release assist valve 122 to back-dump air pressure in the supply reservoir to the brake pipe 24 so as to assist in propagating the braking release signal back through the train. The following chart provides a summary of the valve positions during release of braking with the back-dumping of air pressure from the supply reservoir 32 to the brake pipe 24.

| VALVE | POSITION |
| --- | --- |
| Vent Valve (52) | CLOSED |
| Emergency Charge Valve (56) | CLOSED |
| Charge Control Check Valve 1a (58a) | CLOSED |
| Check Valve 1A (60) | CLOSED |
| Emergency Assuring Valve (64) | CLOSED |
| Relay Valve (66) | CLOSED |
| Relay Valve Exhaust (67) | OPEN |
| Reset Valve (70) | CLOSED |
| Release Button Valves (72, 74) | CLOSED (OUT) |
| Application Valve (94) | CLOSED |
| Regulating Valve (98) | OPEN |
| Regulating Valve Exhaust (99) | CLOSED |
| Release Control Valve (100) | OPEN |
| Cylinder Release Valve (102) | OPEN |
| Cylinder Release Valve Exhaust (105) | CLOSED |
| Release Assist Valve (122) | OPEN |
| Initial Quick Service Valve (124) | CLOSED |
| Emergency Magnet Valve (126) | CLOSED |

The release assist valve 122 will be closed once the brake pipe 24 and the supply reservoir 32 pressures equalize within approximately 10 psig or when the supply reservoir 32 pressure has reduced to approximately 50 psig, whichever occurs first. When this occurs, the controller 34A will actuate the solenoid of charge control check valve 58a and partially reopen the charge control check valve 58a to recharge the supply reservoir 32 at a reduced or retarded rate. When the supply reservoir 32 pressure stabilizes within approximately 5 psig of the brake pipe 24, the controller will fully reopen the charge control check valve 58a to charge the supply reservoir 32 at the normal rate. This reduced or retarded rate of charge is necessary to obtain a more uniform recharge throughout the train. Direct release, as opposed to graduated release, is the only type of release allowed when the controller 34A is in this mode because there is no head end unit. If at any time a brake system on a given car becomes defective or malfunctions, the controller on that car will cut out the affected brake system and log the fault in the memory of the controller for downloading by car department personnel at the next terminal. Likewise, other information can be loaded into the controllers for future use.

EMERGENCY APPLICATION

Where there is no head end unit, emergency brake applications are only available throughout the train at any time via pneumatic communication in the embodiment of FIGS. 4 and 5. A pneumatic emergency brake application and rapid reduction in brake pipe pressure may be initiated by a break-in-two of the train or of the brake pipe, by a burst hose at either end of the brake pipe on a given car, by the engineer moving the automatic brake valve to the emergency position venting pressure in the brake pipe, or by a crew member physically opening a conductor's valve, thereby venting the brake pipe to atmosphere.

A rapid reduction of the brake pipe pressure will cause the vent valve 52 to open venting the brake pipe to atmosphere and serially passing this action through the train. In addition, when the controller 34A detects the brake pipe pressure reducing at an emergency rate via transducer 62, the controller will open the emergency magnet valve 126 to further vent the supply line and the brake pipe pressure to the atmosphere. The emergency magnet valve 126 includes a timer which starts when the emergency magnet valve is opened and holds this valve open for ninety seconds. After ninety seconds, the emergency magnet valve resets itself and closes. As the brake pipe vents, the controller 34A will close the solenoid actuated valve of the release control valve 100. The significant drop in pressure in the brake pipe 24 will also cause the pressure actuated valve of the release control valve 100 to close, thus insuring that the release control valve is closed even if the controller malfunctions. The emergency rate pressure drop in the pilot supply line 90 will cause the emergency assuring valve to open, thereby connecting the air pressure from the supply reservoir 32 to the pilot line 104, raising the pressure in the pilot line 104 in two stages as described above for the pneumatic emergency condition in control valve 30. The emergency rate drop in pressure will also cause the emergency charge valve 56 to open, thereby connecting the supply reservoir 32 to the valve supply volume 92 to maintain adequate pressure in that volume and the pilot supply line. The first stage braking at approximately 15 psig occurs in approximately one and one-half seconds and the remaining brake cylinder pressure build-up will occur in approximately four and one-half seconds through the choke 120. The brake cylinder pressure will be maintained at or below the setting of the regulating valve 98. The following chart provides a summary of the valve positions during the second stage of the pneumatic emergency brake pressure build-up.

| VALVE | POSITION |
| --- | --- |
| Vent Valve (52) | OPEN |
| Emergency Charge Valve (56) | OPEN |
| Charge Control Check Valve 1a (58a) | CLOSED |
| Check Valve 1A (60) | CLOSED |
| Emergency Assuring Valve (64) | OPEN ONLY TO THE CHOKE |
| Relay Valve (66) | OPEN |
| Relay Valve Exhaust (67) | CLOSED |
| Reset Valve (70) | CLOSED |
| Release Button Valves (72, 74) | CLOSED (OUT) |
| Application Valve (94) | CLOSED |
| Regulating Valve (98) | OPEN |
| Regulating Valve Exhaust (99) | CLOSED |
| Release Control Valve (100) | CLOSED |
| Release Control Valve (Pressure) | CLOSED |
| Cylinder Release Valve (102) | OPEN |
| Cylinder Release Valve Exhaust (105) | CLOSED |
| Release Assist Valve (122) | CLOSED |
| Initial Quick Service Valve (124) | CLOSED |
| Emergency Magnet Valve (126) | OPEN |

The final brake cylinder pressure will be at least approximately twenty percent higher than is available with a full service application and is dependent upon the initial charge carried in the brake pipe. In a pneumatic emergency, all of the vent valves 52 on the cars throughout the train will open to serially propagate the pneumatic emergency through the train. Until the brake pipe pressure is restored, the emergency assuring valve 64 and the emergency charge valve 56 will stay open. Once the brake pipe pressure is restored, the emergency assuring valve 64 and the emergency charge valve 56 will close, cutting off communication to the pilot line 104 and valve supply volume 92, respectfully.

RELEASE FROM EMERGENCY

After the ninety second period during which the emergency magnet valve 126 is held open, the emergency magnet valve will automatically close. After this interval has elapsed, the engineer may start the emergency braking release. If the emergency was initiated by a break in the train or brake pipe, the automatic brake valve on the locomotive must be moved to the emergency position and then to the release position in order to reset the system. If the emergency application was initiated due to manual operation of the automatic brake valve or opening of the conductor's valve, then the automatic brake valve must be moved to the emergency position if it is not already there and then moved to the release position to reset the system. Obviously, if a conductor's valve was opened, it must be closed. As the brake pipe charges and the pressure reaches approximately 20 psig, the controller 34A will open the release assist valve 122 to back dump air in the supply reservoir 32 to the brake pipe 24. As the brake pipe pressure increases to within approximately 10 psig of the supply reservoir or the supply reservoir pressure has reduced to approximately 50 psig, whichever occurs first, the controller 34A will close the release assist valve 122. The final release of the brakes is accomplished as described above for service release. A manual release of the brake may also be accomplished using the release button valves 72 and 74 on the control valve 30A as described above for control valve 30.

Referring now to FIGS. 2 and 6, an alternative embodiment of the present invention is shown which includes a control valve 30B operated by controller 34 and adapted to be used on the center car of a three-pack or five-pack articulated car set in electronic trains with a head end unit. The electronic pneumatic control valve 30B employs the emergency side manifold 46 (labeled "MANIFOLD-1A") of control valve 30 and differs from valve 30 in that the service side includes manifold 44B (labeled "MANIFOLD-2B"). Manifold 44B has a similar configuration as manifold 44, except that it includes a second relay valve 130 (labeled "#2 RELAY VALVE").

The operation of control valve 30B is identical to that of control valve 30 except with respect to the operation of second relay valve 130. During charging, air in the reservoir supply line 65 is also connected to the secondary relay valve 130. During charging, the secondary relay valve is closed and the relay valve exhaust 131 is open. During service or emergency braking applications, the controller 34 opens the application valve 94 and/or the emergency assuring valve 64 directing air pressure into the pilot line 104 increasing the pressure in the pilot line 104 calculated by the controller 34. This pressure build-up in the pilot line 104 is directed through the cylinder release valve 102, and into the secondary pilot line 132. The pressure in the secondary pilot line 132 travels through the flange fitting at port 134 (labeled "C3") into the pipe bracket 42 and through the flange fitting at port 136 (labeled "C4") into manifold 44B. The pressure is directed in manifold 44B through the secondary pilot line 132 to the secondary relay valve 130. The secondary relay valve 130 will mimic the actions of the relay valve 66. Accordingly, the secondary relay valve 130 opens to connect the supply reservoir 32 to a relay line 138 in the manifold 44B that connects through a flange fitting at port 140 in the pipe bracket to a relay pipe 142 through a secondary cutout cock 144. The secondary pilot line 132, relay line 138, and relay pipe may be of small diameter to allow quick buildup of the pressure in these lines. The relay pipe 142 is connected to the other articulated cars in the three-pack or five-pack set to communicate braking and release signals to the braking unit of the additional cars, as shown in FIG. 7 and described below. The following chart provides a summary of the valve positions for the electronic control valve 30B during the service braking in a three-pack or five-pack articulated car set.

| VALVE | POSITION |
| --- | --- |
| Vent Valve (52) | CLOSED |
| Emergency Charge Valve (56) | CLOSED |
| Emergency Assuring Valve (64) | CLOSED |
| Relay Valve (66) | OPEN |
| Relay Valve Exhaust (67) | CLOSED |
| Reset Valve (70) | OPENED (TEMPORARILY) |
| Release Button Valves (72, 74) | CLOSED (OUT) |
| Application Valve (94) | OPEN |
| Regulating Valve (98) | OPEN |
| Regulating Valve Exhaust (99) | CLOSED |
| Release Control Valve (100) | CLOSED |
| Cylinder Release Valve (102) | OPEN |
| Cylinder Release Valve Exhaust (105) | CLOSED |
| Secondary Relay Valve (130) | OPEN |
| Secondary Relay Valve Exhaust (131) | CLOSED |

Referring now to FIG. 7, a pneumatic braking unit (i.e., a non-electronic pneumatic control valve), generally indicated by numeral 150, is mounted on each of the additional cars on a three-pack or five-pack articulated car set for use in conjunction with the electronic pneumatic control valve 30B of FIG. 6 on the center car of a three-pack or five-pack articulated car set. The braking unit 150 generally includes a relay manifold 152 (labeled "MANIFOLD-3B") attached to the service side of the pipe bracket and a blanking plate 154 (labeled "BLANKING PLATE-1") attached to the emergency side of the pipe bracket 42 to block all ports on that side except for connecting ports 112 and 134.

During charging of the system on these articulated cars, the compressed air in the brake pipe 24 is directed through the dirt collector/cut-out cock 28 and into the pipe bracket 42 and to the manifold 152 where the air is directed to the vent valve 52 and a check valve 156 (labeled "CHECK VALVE"). During charging, the vent valve 52 is closed and it remains closed during operation, except as described below. Check valve 156 is a normally closed conventional spring biased pressure actuated valve that opens when the pressure on the brake pipe side exceeds the pressure on the reservoir side. The compressed air flows through the check valve 156 to a secondary reservoir supply line or passageway 158 which is connected to a relay valve 160 (labeled "#3 RELAY VALVE") in manifold 152 and to both the emergency reservoir 80 and the auxiliary reservoir 88 which are combined as the supply reservoir 32. Air in the reservoir supply line 158 is thereby directed to the supply reservoir 32 and to the secondary relay valve 130 in the manifold 152 during charging and normal operation. The supply reservoir 32 provides compressed air to the relay valve 160 via the reservoir supply line 158 for use in applying the brakes, as described below. The blanking plate 154 renders redundant the valve supply chamber 92. During charging, the relay valve 160 is closed and the relay valve exhaust 161 is open, which allows the brake cylinder pipe 38 to vent to atmosphere. The following chart provides a summary of the valve positions during charging of the relay control valve 150.

| VALVE | POSITION |
| --- | --- |
| Vent Valve (52) | CLOSED |
| Check Valve (156) | OPEN |
| Relay Valve (160) | CLOSED |
| Relay Valve Exhaust (161) | OPEN |

The control valve 30B of FIG. 6 actuates the braking systems on the cars on either end of the pack. During service and emergency braking applications, the secondary relay valve 130 in control valve 30B on the center car opens to increase the pressure in the relay pipe 142. This increase in pressure signal travels to the additional cars on the articulated car set, through a cut-out cock 162 into the pipe bracket 42, and through relay pilot line 164 to the relay valve 160 which mimics the actions of the relay valve 66, as well as the secondary relay valve 130, in control valve 30B. As the pressure to the relay valve 160 increases, the relay valve 160 opens, thereby directing air pressure from the supply reservoir 32 through the relay valve 160 and to the relay brake cylinder line 166. The brake cylinder line 166 directs the air pressure through the manifold 152 to the pipe bracket 42 at port 136 (labeled "C4"), through the pipe bracket to port 134 (labeled "C3"), and into the blanking plate 154. The blanking plate 154 directs the air back through the pipe bracket at port 112 (labeled "C") through port 114 (labeled "PORT 3") to the brake cylinder pipe 38 and to the brake cylinder 40 to apply the brakes on the additional car.

The additional relay valve 160 will direct air pressure from the supply reservoir 32 to the brake cylinder 40 to apply braking on additional cars in the three-pack or five-pack articulated car set at substantially the same time as the relay valve 66 on the center car directs air pressure to the brake cylinder line on that car. Since the secondary relay valve 130 on the center car and the additional relay valve 160 on the additional cars mimic the relay valve 66 on center car, the braking operations on all cars in the pack will respond alike during service braking, service release, emergency braking, emergency release applications, and manual braking release.

Referring now to FIGS. 4 and 8, a further embodiment of the present invention is shown which includes a universal electronic pneumatic control valve 30C operated by the controller 34A for use on three-pack or five-pack articulated car sets. Being universal, this control valve will work on electronic trains having a head end unit as well as trains without a head end unit to provide electronically or pneumatically controlled braking. Further, this valve would be teamed with braking units on additional articulated cars like in FIG. 7. The control valve 30C includes the emergency side manifold 46A (labeled "MANIFOLD-2A") of control valve 30A (FIG. 5) and the service side manifold 44B (FIG. 6) (labeled "MANIFOLD-2B") of control valve 30B. Thus, the electronic pneumatic control valve 30C will function like control valve 30A in trains having or not having a head end unit and will function like control valve 30B in regard to relaying braking signals to the additional cars in the three-pack or five-pack articulated car set.

Referring now to FIGS. 9 and 10, a modification and a preferred embodiment of the present invention is shown which includes an electronic pneumatic control valve 30D operated by an electronic pneumatic controller 34D, in combination with a head end unit on a locomotive. The control valve 30D employs the service side manifold 44 (labeled "MANIFOLD-1B") of control valve 30 and replaces the emergency side manifold 46 with a manifold 46D (labeled "MANIFOLD-1A-1").

Control valve 30D is like control valve 30, except that it is simpler and less expensive because it incorporates the function of the emergency charge valve into the emergency assuring valve 64A and eliminates the transducer T4 which measures the pressure in the pilot line 104. Similarly, the controller 34D is like controller 34, except that it does not monitor transducer T4 and it monitors a pressure switch 202 in the control valve 30D for shutting down the controller when the car is not in use, as discussed below. More particularly, the emergency assuring valve 64A includes a pair of normally open spring-biased pressure actuated valves, which are maintained closed by the air pressure in the braking pipe 24 and the supply line 55 during charging, service applications, release applications, electronic emergency braking applications, and emergency releases. However, during pneumatic emergency braking applications, the pressure in the brake pipe 24 drops at an emergency rate and below a threshold level, causing a drop in pressure from the supply line 55 to the emergency assuring valve 64A. The pressure drop causes the valves in the emergency assuring valve to open, connecting the supply reservoir 32 via the supply reservoir line 65 to the valve supply chamber 92 via the pilot supply line 90. The opening of this valve eliminates the need for the emergency charge valve because it allows the supply reservoir to constantly recharge the valve supply chamber during pneumatic emergency braking applications. The drop in pressure also causes the other valve in the emergency assuring valve 64A to open, connecting the valve supply chamber 92 via the pilot supply line 90 and through the regulating valve 98 to the pilot line 104 via a diverter valve 200. The diverter valve 200 provides the two-stage braking necessary for pneumatic emergencies and is a conventional spring-biased pressure actuated valve which is normally open to the pilot line. The diverter valve 200 directs the air pressure from the valve supply chamber directly to the pilot line 104 for approximately one and one-half seconds to provide the first stage of braking. When the diverter valve, which is actuated by a changing pressure in the pilot line, senses approximately 15 psig in the pilot line 104, it will divert the air pressure from the valve supply chamber 92 through the choke 120. The choke facilitates the second stage of pressure build-up in the pilot line 104 in approximately four and one-half seconds, thereby retarding the brake pressure buildup. The increase of pressure in the pilot line 104 causes the relay valve 66 to open, connecting the supply reservoir 32 to the brake cylinder 40.

The pressure switch 202 minimizes drain on the battery or power supply 48 which provides power to the controller 34D, and is connected to and monitors the supply line 55. The pressure switch includes a timer activated at substantially zero pressure in the supply line or brake pipe. After a predetermined period of time, such as twenty to thirty minutes, the timer in the pressure switch turns off the central processing unit 47 of electronic controller 34D to stop battery drain. Alternatively, the pressure switch 202 could be connected between the power supply 48 and the central processing unit 47 to cut the power between them, thereby shutting down the central processing unit. When the pressure in the brake pipe and thus the supply line resumes (i.e., when the car is hooked up to a train), the pressure switch 202 is actuated to turn on the electronic controller 34D.

The control valve 30D further includes a valve supply drain 204 manually operable for exhausting the valve supply chamber 92 in the pipe bracket. The valve supply drain 204 is a pressure closable and manually openable and closable valve which facilitates the emptying of the valve supply volume, for instance, when a car is disconnected from a train. The valve supply drain is connected to the valve supply chamber 92 via the pilot supply line 90 and is also connected to the reset valve 70. Each time the reset valve 70 is opened during service braking and emergency braking to insure that the release button valves 72 and 74 are closed, the reset valve also directs air pressure to the valve supply drain 204 to insure that it is closed. Additionally, during charging of the system, when there are approximately 20 psig in the supply reservoir 32, the controller 34D will open the reset valve 70 to insure that the valve supply drain is closed. After the reset valve is temporarily opened, the air directed to the release button valves 72 and 74 and the valve supply drain 204 will be exhausted through the reset valve exhaust 71.

While transducers 62 ("T1"), 68 ("T2"), 96 ("T3"), and 110 ("T5") are employed in control valve 30D, transducer T4 employed in the control valve 30 to measure the air pressure in the pilot line 104 is omitted from control valve 30D because it is not needed. The controller 34D may be programmed such that it does not need direct information on the pressure in the pilot line 104 because the controller receives information regarding the pressure in the brake cylinder line 111, brake cylinder pipe 38, and brake cylinder 40, from transducer T5. The air pressure in the brake cylinder line 111 is equal to the pressure in the pilot line 104 since the relay valve 66 directs air pressure to the brake cylinder from the supply reservoir 32 at a pressure equal to that of the pilot line 104. Thus, if the pressure to the brake cylinder 40 drops because of leakage or otherwise during service applications, the controller 34D will reopen the application valve 94 to increase the pressure in the pilot line 104 and thus the brake cylinder line 111 via the opening of the relay valve 66. Likewise, if the brake cylinder pressure is greater than the desired pressure, for instance, in a graduated release, the controller will open the release control valve 100 to drop the pressure in the pilot line 104, thereby causing the relay valve to operate to exhaust brake cylinder pressure through the relay valve exhaust 67 down to the desired braking level. Accordingly, the controller 34D and the control valve 30D may work without directly receiving information as to the pressure in the pilot line 104. All other functions of the controller 34D and control valve 30D are the same as controller 34 and control valve 30, including vent valve 52, check valves 58 and 60, and cylinder release valve 102.

The electronic pneumatic brake system of the present invention may also include a drain cock 210 for facilitating manually draining of the supply reservoir 32, for instance, when a car is disconnected from a train. The drain cock 210 is a manually operated valve which may be connected to the pipe between the control valve and the supply reservoir, and in particular the auxiliary reservoir, although it should be appreciated that it may be connected to the emergency reservoir, or both.

Referring now to FIGS. 11 and 12, a modification and preferred embodiment of the present invention is shown which includes a universal electronic pneumatic control valve 30E operated by an electronic pneumatic controller 34E and adapted to be used on a train with or without a head end unit in the locomotive. The control valve 30E employs the service side manifold 44 (labeled "MANIFOLD-1B") of control valve 30 and replaces the emergency side manifold 46 with manifold 46E (labeled "MANIFOLD-2A-1"). Control valve 30E operates and functions exactly as control valve 30D when used on a train with a head end unit. If there is no head end unit on the train, the control valve 30E and the controller 34E respond to pneumatic brake signals in the brake pipe 24 issued by the engineer using the automatic brake valve.

Similar to control valve 30D, control valve 30E incorporates the function of the emergency charge valve into the emergency assuring valve 64A, includes a diverter valve 200, a pressure switch 202, and a valve supply drain 204 and eliminates transducer T4. The control valve 30D further includes an initial quick service valve 124 connected to the supply line 55 which assists in propagating the brake pipe pressure reduction during service applications similar to control valve 30A. More particularly, when the controller 34E senses a reduction in the brake pipe, it will actuate or open the solenoid operated initial quick service valve 124 to reduce the pressure in the supply line 55, and thus the brake pipe 24 which propagates the braking signal back through the train. The controller 34E will close the initial quick service valve when it senses the reduction of air pressure in the brake pipe leveling off at a reduced pressure through transducer 62.

The control valve 30E further includes two solenoid actuated release assist valves 122A and 122B which connect the supply reservoir 32 via the supply reservoir line 65 to the brake pipe 24 via the supply line 55 to facilitate back dumping of air to the brake pipe from the supply reservoir during release applications for propagating the pneumatic brake signal to other cars. The release assist valves 122A and 122B are normally closed solenoid actuated valves which function like the release assist valve 122 in control valve 30A. Two release assist valves are preferable to insure that enough air pressure flow is directed from the supply reservoir to the brake pipe during the back dumping procedure. The controller 34E opens these valves when it senses an increase in the brake pipe pressure which indicates a release of braking. When the controller senses the pressure in the brake pipe leveling off, it will close the release assist valves 122A and 122B. It should be appreciated that the release assist valves could be configured to be piloted or controlled by a single solenoid operated by the controller.

The control valve 30E also includes a charge control check valve 58a (labeled "CHECK VALVE 2") like in control valve 30A. After the release assist valves 122A and 122B are closed (i.e., the brake pipe 24 and the supply reservoir 32 pressures equalize within approximately 10 psig or when the supply reservoir 32 pressure has reduced to approximately 50 psig, whichever occurs first), the controller 34E will actuate the solenoid of charge control check valve 58a and partially reopen the charge control check valve 58a to recharge the supply reservoir 32 at a reduced or retarded rate. When the supply reservoir 32 pressure stabilizes within approximately 5 psig of the brake pipe 24, the controller will fully reopen the charge control check valve 58a to charge the supply reservoir 32 at the normal rate. This reduced or retarded rate of charge is necessary to obtain a more uniform recharge throughout the train. Direct release, as opposed to graduated release, is the only type of release allowed when the controller 34E is in this mode because there is no head end unit.

Referring now to FIGS. 9 and 13, a modification and a preferred embodiment of the present invention is shown which includes an electronic pneumatic control valve 30F operated by an electronic pneumatic controller 34D on the center car of a three-pack or five-pack articulated car set in a train with a head end unit. The control valve 30F employs the emergency side manifold 46D (labeled "MANIFOLD-1A-1") of control valve 30D, as shown in FIG. 10, and replaces the service side manifold 44 with a manifold 44B (labeled "MANIFOLD-2B"), as in control valve 30B in FIG. 6.

The control valve 30F is like control valve 30D of FIG. 10 except that it additionally directs pressure in the pilot line 104 into a secondary pilot line 132. The pressure in the secondary pilot line is directed through the pipe bracket 42 and to the secondary relay valve 130 in the manifold 44B. The secondary relay valve directs air pressure from the supply reservoir 32 to the relay pipe 142 in response to the pressure increase in the secondary pilot line 132, and thereby mimics the actions of relay valve 66. The relay pipe directs this pressure increase to the additional or slave cars on the three-pack or five-pack articulated car set like control valve 30B of FIG. 6.

Referring now to FIG. 14, a modification and a preferred embodiment of the present invention is shown which includes a non-electronic pneumatic brake unit 150A for the additional or slave cars in a three-pack or five-pack articulated car set. Braking unit 150A responds to pressure increases and decreases in the relay pipe 142. The brake unit 150A is exactly like brake unit 150 (FIG. 7) except that it includes a service side manifold 152A (labeled "MANIFOLD-3B-2") which does not include a vent valve while blanking plate 154A includes a vent valve 52a. The vent valve in this embodiment which is connected to the brake pipe 24 has been moved to the blanking plate because it may be difficult to physically fit the vent valve on manifold 152A. Otherwise, braking unit 150A functions exactly as braking unit 150 in charging the supply reservoir 32 and 17 applying the brakes on the additional cars in an articulated car set in response to pneumatic signals relayed from the center car through the relay pipe 142. It should therefore be appreciated that that braking unit 150A may be installed on the additional cars of a three-pack or five-pack articulated car set in conjunction with the control valve 30B and controller 34, or control valve 30C and controller 34A, as well as with control valve 30F and controller 34D.

Referring now to FIGS. 11 and 15, a modification and a preferred embodiment of the present invention is shown which includes a universal electronic control valve 30G operated by an electronic pneumatic controller 34E and adapted to be used on the center car of a three-pack or five-pack articulated car set in a train having or not having a head end unit. The control valve 30G employs the service side manifold 44B (labeled "MANIFOLD-2B") of control valve 30B (FIG. 6) and control valve 30F (FIG. 13) and employs the emergency side manifold 46E (labeled "MANIFOLD-2A-1") of control valve 30E (FIG. 12). Control valve 30G functions exactly like control valve 30E whether or not there is a head end unit and thus responds to pneumatic braking signals when there is no head end unit. It additionally functions like control valve 30F in that it relays a pneumatic braking signal to the additional cars in an articulated car set via the relay pipe 142. The universal control valve 30G and controller 34E thus work in conjunction with the braking unit 150A (FIG. 14) to apply the brakes on an articulated car set.

It will be understood that modifications and variations may be effected without departing from the scope of the novel concepts of the present invention, and it is understood that this application is to be limited only by the scope of the appended claims.

The invention is hereby claimed as follows:

1. An electronic pneumatic brake system for a train having a locomotive and a plurality of cars connected to said locomotive, each car having an electronic pneumatic control valve and an electronic pneumatic controller connected to and operating said control valve, a brake pipe on each car and the locomotive intercommunicating with each other, air supply means in the locomotive for supplying air at desired levels of pressure to the brake pipes, an electronic head end unit in the locomotive, means for communicating between said head end unit and said controllers, an auxiliary air reservoir and an emergency air reservoir on each car, at least one brake cylinder on each car, said control valve including:
  means for connecting said auxiliary and emergency air reservoirs into a pneumatically combined air supply reservoir,
  means connecting the brake pipe to the air supply reservoir to charge the supply reservoir and to maintain the air pressure in the supply reservoir at least to the level of the air pressure in the brake pipe,
  a relay valve for selectively connecting said supply reservoir to said brake cylinder,
  a pilot line connected to said relay valve,
  an application valve for selectively supplying air pressure to the pilot line to pressurize the pilot line and actuate the relay valve to produce a braking application,
  a release control valve for selectively exhausting air pressure from the pilot line to produce a release of the braking application,
  and means for measuring the pressures in the brake pipe, supply reservoir, and the pilot line and/or the brake cylinder and for providing signals to the controller, said controller including means for operating the application valve and the release control valve, whereby said electronic pneumatic controllers and control valves respond to braking and release commands generated by said head end unit.

2. The brake system of claim 1, wherein said means for connecting said auxiliary and emergency air reservoirs includes a pipe bracket connected to said reservoirs and a manifold attached to one side of the pipe bracket which connects said reservoirs.

3. The brake system of claim 1, wherein said means connecting the brake pipe to the supply reservoir includes a check valve which allows the flow of air pressure from the brake pipe to the supply reservoir.

4. The brake system of claim 3, wherein said check valve is a normally closed spring-biased valve.

5. The brake system of claim 1, wherein said means for providing retarded pressure buildup in the pilot line includes a diverter valve and a choke which coact to provide a two-stage braking application during pneumatic emergencies.

6. The brake system of claim 1, which further includes a valve supply chamber means for storing air and for supplying air to said application valve.

7. The brake system of claim 6, which further includes means connecting the brake pipe to said valve supply chamber means for maintaining the pressure in the valve supply chamber means at least to the level of the pressure in the brake pipe.

8. The brake system of claim 7, wherein said means connecting the brake pipe to said valve supply chamber means includes a check valve which allows the flow of air pressure from the brake pipe to the valve supply chamber means.

9. The brake system of claim 7, which further includes means for connecting said supply reservoir to said valve supply chamber means during pneumatic emergencies to maintain the pressure in the valve supply chamber means and to the application valve at least to the level of the pressure in the supply reservoir.

10. The brake system of claim 9, wherein said means for connecting said supply reservoir to said valve supply chamber means during pneumatic emergencies includes a pressure actuated emergency charge valve which is connected to the brake pipe and pneumatically opens in response to an emergency rate pressure drop in the brake pipe pressure.

11. The brake system of claim 6, which further includes means connecting said valve supply chamber means to said pilot line for providing a retarded buildup of pressure in the pilot line during pneumatic emergencies.

12. The brake system of claim 6, which further includes means for measuring the pressure in the valve supply chamber means and for providing a signal to the controller.

13. The brake system of claim 6, which further includes means for venting the valve supply chamber means.

14. The brake system of claim 1, wherein the release control valve is a dual cartridge spring-biased and solenoid actuated valve connected to the brake pipe and adapted to close during pneumatic emergencies.

15. The brake system of claim 1, which further includes release button valve means mounted on each car for manually releasing pressure to said brake cylinder to release the braking application.

16. The brake system of claim 15, which further includes means for automatically resetting said release button valve means.

17. The brake system of claim 16, wherein said release button valve means is adapted to direct air pressure to a cylinder release valve means connected between the application valve and the relay valve for reducing the pressure to the relay valve while maintaining air pressure in the pilot line.

18. The brake system of claim 1, which further includes pressure switch means connected to the brake pipe for turning off the controller after a predetermined period when the car is not in use.

19. The brake system of claim 1, which further includes a vent valve for exhausting the brake pipe during pneumatic emergencies.

20. The brake system of claim 1, which further includes a secondary relay valve means for selectively connecting a secondary supply reservoir on an articulated car to a secondary brake cylinder on said articulated car.

21. The brake system of claim 1, wherein the pressure measuring means includes pressure measuring transducers which send electrical signals to the controller.

22. The electronic pneumatic brake system of claim 1, which further includes means for exhausting the supply reservoir.

23. The brake system of claim 1, wherein the application valve and the release control valve are solenoid actuated to control the pressure in the pilot line and to provide graduated release of the braking application and to reset the braking application.

24. The brake system of claim 1, wherein the control valve further includes pressure switch means connected to the brake pipe for turning on the controller when the brake pipe is pressurized.

25. The brake system of claim 1, which further includes means for turning off the controller after a predetermined period when the car is not in use.

26. The brake system of claim 1, which further includes means for supplying power to said controller.

27. The brake system of claim 26, wherein said power supply means includes a battery rechargeable by a generator driven by an axle on said car.

28. An electronic pneumatic brake system for a train having a locomotive and a at least one car connected to said locomotive, said car having a universal electronic pneumatic control valve and a universal electronic pneumatic controller connected to and operating said control valve, said control valve and said controller adapted to respond to electronic commands from a head end unit on the locomotive or from pneumatic commands from the locomotive, a brake pipe on said car and the locomotive intercommunicating with each other, air supply means in the locomotive for supplying air to the brake pipes, an air supply reservoir on said car, at least one brake cylinder on said car, said control valve including:

means connecting the brake pipe to the supply reservoir to charge the supply reservoir and to maintain the pressure in the supply reservoir at least to the level of the pressure in the brake pipe, a relay valve for selectively connecting said supply reservoir to said brake cylinder, a pilot line connected to said relay valve, an application valve for selectively supplying air pressure to the pilot line to pressurize the pilot line and actuate the relay valve to produce a braking application, a release control valve for selectively exhausting air pressure in the pilot line to produce a release of the braking application, and means for measuring the pressures in the brake pipe, supply reservoir, and the pilot line and/or the brake cylinder and for providing signals to the controller, said controller including means for operating the application valve and the release control valve, whereby said electronic pneumatic controllers and control valves respond to electronic braking and release commands from the head end unit on the locomotive or to pneumatic braking and release commands in the brake pipe if no head end unit is detected during train setup.

29. The brake system of claim 28, which further includes a valve supply chamber means for storing air and for supplying air to said application valve.

30. The brake system of claim 29, wherein said control valve further includes means for exhausting said valve supply chamber means.

31. The brake system of claim 28, which further includes means connected to the brake pipe for propagating a pneumatic braking command to the other cars in the train by selectively exhausting air in the brake pipe.

32. The brake system of claim 31, wherein said propagating means includes an initial quick service valve.

33. The brake system of claim 32, wherein said initial quick service valve is a solenoid actuated valve operated by the controller.

34. The brake system of claim 28, which further includes means connecting the supply reservoir to the brake pipe for propagating a pneumatic release command to the other cars in the train by selectively back dumping air from the supply reservoir to the brake pipe.

35. The brake system of claim 34, wherein said release propagating means includes at least one solenoid actuated release assist valve operated by the controller.

36. The brake system of claim 28, which further includes emergency magnet valve means for exhausting air from the brake pipe during pneumatic emergencies for a predetermined period of time to propagate pneumatic emergency commands throughout the train.

37. The brake system of claim 28, which further includes means for manually releasing and resetting the braking application.

38. The brake system of claim 37, which further includes means for overriding accidental or undesired manual release of said braking application.

39. The electronic pneumatic brake system of claim 28, which further includes means for exhausting the supply reservoir.

40. The brake system of claim 28, wherein said means connecting the brake pipe to the supply reservoir includes a charge control check valve adapted to limit the charging rate of the supply reservoir.

41. The brake system of claim 40, wherein the charge control check valve is solenoid actuated.

42. The brake system of claim 28, which further includes means for supplying power to said controller.

43. The brake system of claim 42, wherein said power supply means includes a battery rechargeable by a generator driven by an axle on said car.

44. An electronic pneumatic control valve for an electronic pneumatic brake system on a train having a locomotive and at least one car, said car having a brake pipe, an auxiliary air reservoir, an emergency air reservoir, and a brake cylinder, said control valve comprising a pipe bracket in communication with the brake pipe, brake cylinder, auxiliary reservoir, and emergency reservoir, first and second manifolds connected to said pipe bracket, said manifolds connecting said auxiliary and emergency reservoirs into a pneumatically combined air supply reservoir, said first manifold providing all normal and emergency braking and release of braking applications and including:

means for connecting the brake pipe to the supply reservoir to maintain the pressure in the supply reservoir at least to the level of the pressure in the brake pipe, a pneumatically actuated relay valve for selectively connecting the supply reservoir to the brake cylinder, a pilot line connected to the relay valve, electronically controlled means for selectively supplying air pressure to the pilot line to pressurize the pilot line and actuate the relay valve to produce normal and electronic emergency braking applications, and pneumatic controlled means connected to the brake pipe for selectively supplying air pressure to the pilot line to pressurize the pilot line and actuate the relay valve to produce pneumatic emergency braking applications.

45. The electronic pneumatic control valve of claim 44, wherein the pipe bracket has a service side and an emergency side and the first manifold is connected to the emergency side of the pipe bracket.

46. The electronic pneumatic control valve of claim 45, wherein said means for selectively supplying air pressure to the pilot line in normal and electronic emergency braking applications includes a solenoid actuated application valve.

47. The electronic pneumatic control valve of claim 46, wherein the first manifold includes means for selectively exhausting air pressure in the pilot line to produce a release of the braking application.

48. The electronic pneumatic control valve of claim 47, wherein the second manifold is connected to the service side of the pipe bracket and further includes a pneumatically actuated vent valve for exhausting the brake pipe during pneumatic emergencies.

49. The electronic pneumatic control valve of claim 44, wherein the first manifold includes means for connecting the brake pipe to a valve supply chamber in said pipe bracket to maintain the pressure in said valve supply chamber at least to the level of pressure in the brake pipe.

50. The electronic pneumatic control valve of claim 49, wherein said means for supplying air pressure to the pilot line in normal and electronic emergency braking applications includes a solenoid actuated application valve for connecting the valve supply chamber to the pilot line.

51. The electronic pneumatic control valve of claim 50, wherein the first manifold includes means for maintaining the pressure in the valve supply chamber during pneumatic emergencies.

52. The electronic pneumatic control valve of claim 51, wherein the pressure maintaining means includes a pneumatically actuated emergency charge valve connecting the supply reservoir and the valve supply chamber.

53. The electronic pneumatic control valve of claim 52, wherein the first manifold includes means for providing a two-stage braking application in pneumatic emergencies.

54. An electronic pneumatic brake system for a train having a locomotive and a at least one car connected to said locomotive, said car having an electronic pneumatic control valve and an electronic pneumatic controller connected to and operating said control valve, said control valve including a pipe bracket having an emergency side and a service side, and manifolds mounted on each of said sides of said pipe bracket, a brake pipe on said car and the locomotive intercommunicating with each other and said pipe bracket, air supply means in the locomotive for supplying air to the brake pipes, an electronic head end unit in the locomotive, means for communicating between said head end unit and said controllers, an air supply reservoir on said car connected to said pipe bracket, at least one brake cylinder on said car connected to said pipe bracket, said manifold on the emergency side of said pipe bracket adapted to provide both normal and emergency braking and release of braking applications, said manifold including:

means connecting the brake pipe to the air supply reservoir for maintaining the air pressure in the supply reservoir at least to the level of the air pressure in the brake pipe, a relay valve for selectively connecting said supply reservoir to said brake cylinder, a pilot line connected to said relay valve, an application valve for selectively supplying air pressure to the pilot line to pressurize the pilot line and actuate the relay valve to produce a braking application, a release control valve for selectively exhausting the air in the pilot line to produce a release of the braking application, and means for measuring the pressures in the brake pipe, supply reservoir, air supply chamber, and the pilot line and/or the brake cylinder and providing signals to the controller, said controller including means for operating the application valve and the release control valve, whereby said electronic pneumatic controller and control valve respond to braking and release commands generated by said head end unit.

55. The brake system of claim 54, wherein said means communicating between said head end unit and said controllers include radio telemetry.

56. The brake system of claim 54, wherein said means communicating between said head end unit and said controllers include electrical connections between the head end unit and the controllers.

57. The brake system of claim 54, wherein said means maintaining the pressure level in the supply reservoir includes a spring-biased check valve.

58. The brake system of claim 54, wherein said pipe bracket includes a valve supply chamber and said emergency side manifold includes means connecting the brake pipe to the valve supply chamber to maintain the pressure in the valve supply chamber at least to the level of the pressure in the brake pipe.

59. The brake system of claim 54, wherein said emergency side manifold includes a pressure actuated emergency charge valve connected to the brake pipe, the supply reservoir, and the valve supply chamber, and said emergency charge valve is adapted to open when the brake pipe pressure drops at an emergency rate to supply air pressure from the supply reservoir to the valve supply chamber.

60. The brake system of claim 54, wherein said pressure measuring means includes transducers which send electrical signals to the controller.

61. The brake system of claim 54, which further includes at least one release button valve on each car manually operable between closed and open positions and pressure operable to closed position, said release button valves being connected to the supply reservoir and said pilot line to provide manual release of braking applications.

62. The brake system of claim 61, wherein said control valve further includes means for resetting said release button valve to closed position.

63. The brake system of claim 62, wherein the manifold on the emergency side further includes pressure switch means connected to the brake pipe for turning off the controller after a predetermined period when the car is not in use.

64. The brake system of claim 63, wherein said control valve further includes a manifold on the service side which has a pressure actuated vent valve.

65. The brake system of claim 54, wherein the application valve and the release control valve are solenoid actuated to control the pressure in the pilot line and to provide graduated release of the braking application and to reset the braking application.

66. The brake system of claim 54, wherein the emergency side manifold includes pressure switch means connected to the brake pipe for turning on the controller when the brake pipe is pressurized.

67. The brake system of claim 54, wherein the service side manifold connects an auxiliary air reservoir and an emergency air reservoir on the car into said supply reservoir.

68. The brake system of claim 54, which further includes a second relay valve in the service side manifold and a second pilot line connecting said first pilot line to said second relay valve, said second relay valve adapted to relay braking and release signals from the control valve to a pneumatic control valve on an adjacent car.

69. An electronic pneumatic brake system for a train having a locomotive and a at least one car connected to said locomotive, said car having an electronic pneumatic control valve and an electronic pneumatic controller connected to and operating said control valve, a brake pipe on said car and the locomotive intercommunicating with each other, air supply means in the locomotive for supplying air to the brake pipes, an air supply reservoir on said car, a valve supply chamber on said car, at least one brake cylinder on said car, said control valve including:

a first check valve connecting said brake pipe to said air supply reservoir, a second check valve connecting said brake pipe to said valve supply chamber, a relay valve selectively connecting said supply reservoir to said brake cylinder, an application valve connecting said valve supply chamber to said relay valve to actuate the relay valve and produce a braking application, a release control valve connected to said application valve, said relay valve, and said brake pipe to produce a release of the braking application, and an emergency assuring valve for selectively connecting said valve supply chamber to said relay valve during pneumatic emergencies to produce an emergency braking application.

70. The brake system of claim 69, wherein the control valve further includes means for propagating pneumatic commands throughout the train which comprises an initial quick service valve connected to said brake pipe, and at least one release assist valve connected to said supply reservoir and said brake pipe.

71. The brake system of claim 69, which further includes an emergency charge valve connecting the supply reservoir to the valve supply chamber during pneumatic emergencies.

72. The brake system of claim 69, wherein the emergency assuring valve incorporates an emergency charge valve connecting the supply reservoir to the valve supply chamber during pneumatic emergencies.

73. The electronic pneumatic brake system of claim 69, which further includes a valve supply drain for exhausting the air pressure in the valve supply chamber.

74. An electronic pneumatic brake system for a train having a locomotive and an articulated set of cars connected to said locomotive, said articulated set of cars including a master car and at least one slave car, said master car having a universal electronic pneumatic control valve and a universal electronic pneumatic controller connected to and operating said control valve, said control valve and said controller adapted to respond to electronic commands from a head end unit on the locomotive or from pneumatic commands from the locomotive, a brake pipe on each car and the locomotive intercommunicating with each other, air supply means in the locomotive for supplying air to the brake pipes, an air supply reservoir on each car, at least one brake cylinder on each car, said control valve including:

means connecting the brake pipe to the air supply reservoir to charge the supply reservoir and to maintain the air pressure in the supply reservoir at least to the level of the air pressure in the brake pipe, a first relay valve for selectively connecting said supply reservoir to said brake cylinder, a first pilot line connected to said first relay valve, an application valve for selectively supplying air pressure to the first pilot line to pressurize the first pilot line and actuate the first relay valve to produce a braking application on the master car, a release control valve for selectively exhausting air pressure in the first pilot line to produce a release of the braking application on the master car, a second relay valve for selectively relaying the braking and release signals to said slave car, a second pilot line connected between said first pilot line and said second relay valve, and means for measuring the pressures in the brake pipe, supply reservoir, and the first pilot line and/or the brake cylinder and for providing signals to the controller, said controller including means for operating the application valve and the release control valve, whereby said electronic pneumatic controller and control valve respond to electronic braking and release commands from the head end unit on the locomotive or to pneumatic braking and release commands in the brake pipe if no head end unit is detected during train setup.

75. The brake system of claim 74, wherein the slave car includes means for connecting the brake pipe to the supply reservoir to maintain the pressure in the supply reservoir at least to the level of the pressure in the brake pipe.

76. The brake system of claim 75, wherein the slave car includes a third relay valve for selectively connecting the supply reservoir on the slave car to the brake cylinder on the slave car to produce a braking application on the slave car.

77. The brake system of claim 76, which includes a relay pipe connecting the second relay valve to the third relay valve.

78. The brake system of claim 77, wherein the slave car includes means for combining an auxiliary air reservoir and an emergency air reservoir on the cars.

79. An electronic pneumatic brake system for a train having a locomotive and at least one car connected to said locomotive, said car having an electronic pneumatic control valve and an electronic pneumatic controller connected to and operating said control valve, a brake pipe on the car and the locomotive intercommunicating with each other, air supply means in the locomotive for supplying air at desired levels of pressure to the brake pipes, an auxiliary air reservoir and an emergency air reservoir on said car, at least one brake cylinder on said car, said control valve including:

means for connecting said auxiliary and emergency air reservoirs into a pneumatically combined air supply reservoir, means connecting the brake pipe to the air supply reservoir to charge the supply reservoir and to maintain the air pressure in the supply reservoir at least to the level of the air pressure in the brake pipe, a relay valve for selectively connecting said supply reservoir to said brake cylinder, a pilot line connected to said relay valve, an application valve for selectively supplying air pressure to the pilot line to pressurize the pilot line and actuate the relay valve to produce a braking application, a release control valve for selectively exhausting air pressure from the pilot line to produce a release of the braking application, and means for measuring the pressures in the brake pipe, the supply reservoir, and the pilot line and/or the brake cylinder and for providing signals to the controller, said controller including means for operating the application valve and the release control valve, whereby said controller and control valve respond to braking and release commands generated by the locomotive.

80. The brake system of claim 79, wherein the control valve and the controller are universal and are adapted to respond to electronic commands from a head end unit on the locomotive or from pneumatic commands from the locomotive.

81. The brake system of claim 79, wherein the locomotive includes a head end unit and the control valve and the controller are adapted to respond to electronic commands from said head end unit.

82. The electronic pneumatic brake system of claim 79, which further includes means for activating the electronic pneumatic controller when the brake pipe is pressurized.

83. The electronic pneumatic brake system of claim 82, wherein said means for activating the electronic pneumatic controller is a pressure switch.

84. The electronic pneumatic brake system of claim 79, which further includes means for deactivating the electronic pneumatic controller when the brake pipe is depressurized for a period of time.

85. The electronic pneumatic brake system of claim 84, wherein said means for deactivating the electronic pneumatic controller includes a pressure switch.

86. An electronic pneumatic brake system for a train having a locomotive and at least one car connected to said locomotive, said car having a universal electronic pneumatic control valve and a universal electronic pneumatic controller connected to and operating said control valve, said control valve and said controller adapted to respond to electronic commands from a head end unit on the locomotive or from pneumatic commands from the locomotive, said control valve including a pipe bracket having an emergency side and a service side, and manifolds mounted on each of said sides of said pipe bracket, a brake pipe on said car and the locomotive intercommunicating with each other, air supply means in the locomotive for supplying air to the brake pipes, an air supply reservoir on said car connected to said pipe bracket, at least one brake cylinder on said car, said manifold on the emergency side of said pipe bracket adapted to provide both normal and emergency braking and release applications, said manifold including:

means connecting the brake pipe to the air supply reservoir for maintaining the air pressure in the supply reservoir at least to the level of the air pressure in the brake pipe, a relay valve for selectively connecting said supply reservoir to said brake cylinder, a pilot line connected to said relay valve, an application valve for selectively supplying air pressure to the pilot line to pressurize the pilot line and actuate the relay valve to produce a braking application, a release control valve for selectively exhausting air pressure in the pilot line to produce a release of the braking application, and means for measuring the pressures in the brake pipe, supply reservoir, and the pilot line and/or the brake cylinder and for providing signals to the controller, said controller including means for operating the application valve and the release control valve, whereby said electronic pneumatic controller and control valve respond to electronic braking and release commands from the head end unit on the locomotive or to pneumatic braking and release commands in the brake pipe if no head end unit is detected during train setup.

87. The brake system of claim 86, wherein the application valve and the release control valve are solenoid actuated to control the pressure in the pilot line and to provide graduated release of the braking application and to reset the braking application when controlled by the head end unit.

88. The brake system of claim 86, which further includes a second relay valve in the manifold on the service side of the pipe bracket and a second pilot line connecting said first pilot line to said second relay valve, said second relay valve adapted to relay braking and release signals from the control valve to a pneumatic control valve on an adjacent car.

89. The brake system of claim 86, wherein the manifold on the service side of the pipe bracket includes a vent valve connected to the brake pipe.

90. The brake system of claim 86 wherein the manifold on the service side of the pipe bracket combines an auxiliary air reservoir and an emergency air reservoir on the car into said supply reservoir.

91. An electronic pneumatic brake system for a train having a locomotive and an articulated set of cars connected to said locomotive, said articulated set of cars including a master car and at least one slave car, said master car having an electronic pneumatic control valve and an electronic pneumatic controller connected to and operating said control valve, a brake pipe on each car and the locomotive intercommunicating with each other, air supply means in the locomotive for supplying air to the brake pipes, an electronic head end unit in the locomotive, means for communicating between said head end unit and said controller, an air supply reservoir on each car, at least one brake cylinder on each car, said control valve including:

means connecting the brake pipe to the air supply reservoir to charge the air supply reservoir and to maintain the air pressure in the supply reservoir at least to the level of the air pressure in the brake pipe, a first relay valve for selectively connecting said supply reservoir to said brake cylinder, a first pilot line connected to said first relay valve, an application valve for selectively supplying air pressure to the first pilot line to pressurize the first pilot line and actuate the first relay valve to produce a braking application on the master car, a release control valve for selectively exhausting air from the first pilot line to produce a release of the braking application on the master car, a second relay valve for selectively relaying the braking and release signals to said slave car, a second pilot line connected between said first pilot line and said second relay valve, and means for measuring the pressures in the brake pipe, supply reservoir, and the first pilot line and/or the brake cylinder and for providing signals to the controller, said controller including means for operating the application valve and the release control valve, whereby said electronic pneumatic controllers and control valves respond to braking and release commands from the head end unit.

92. The brake system of claim 91, wherein the slave car includes means for connecting the brake pipe to the supply reservoir to maintain the pressure in the supply reservoir at least to the level of the pressure in the brake pipe.

93. The brake system of claim 92, wherein said means connecting the brake pipe to the supply reservoir includes a check valve which provides the flow of air pressure from the brake pipe to the supply reservoir.

94. The brake system of claim 92, wherein the slave car includes a third relay valve for selectively connecting the supply reservoir on the slave car to the brake cylinder on the slave car.

95. The brake system of claim 94, which includes a relay pipe connecting the second relay valve to the third relay valve.

96. An electronic pneumatic brake system for a train having a locomotive and at least one car connected to said locomotive, said car having an electronic pneumatic control valve and an electronic pneumatic controller connected to and operating said control valve, a brake pipe on said car and the locomotive intercommunicating with each other, air supply means in the locomotive for supplying air at desired levels of pressure to the brake pipes, an air supply reservoir on said car, at least one brake cylinder on said car, at least one manually operated brake release valve mounted on said car, said control valve including:

means connecting the brake pipe to the air supply reservoir to charge the air supply reservoir and to maintain the air pressure in the supply reservoir at least to the level of the air pressure in the brake pipe, a relay valve for selectively connecting said supply reservoir to said brake cylinder, a pilot line connected to said relay valve, an application valve for selectively supplying air pressure to the pilot line to pressurize the pilot line and actuate the relay valve to produce a braking application, a release control valve for selectively exhausting air pressure from the pilot line to produce a release of the braking application, a reset valve for selectively supplying air pressure to the brake release valve to close said brake release valve prior to each braking application, and means for measuring the pressures in the brake pipe, supply reservoir, and the pilot line and/or the brake cylinder and for providing signals to the controller, said controller including means for operating the application valve, the release control valve, and the reset valve, whereby said electronic pneumatic controllers and control valves respond to braking and release commands generated by said locomotive.

97. The brake system of claim 96, wherein the brake release valve is connected to a cylinder release valve in the control valve disposed along the pilot line between the application valve and the relay valve, said cylinder release valve adapted to maintain air pressure in a portion of the pilot line and release air pressure in a portion of the pilot line connected to the relay valve.

98. The brake system of claim 97, wherein the reset valve is solenoid actuated.

99. In an electronic pneumatic brake system for a train having a locomotive and at least one car connected to said locomotive, said car having an electronic pneumatic control valve and an electronic pneumatic controller connected to and operating said control valve, a brake pipe on said car and the locomotive intercommunicating with each other, air supply means in the locomotive for supplying air at desired levels of pressure to the brake pipes, an air supply reservoir on said car, at least one brake cylinder on said car, the improvement in means for manually releasing and automatically resetting a braking application, said means comprising:

at least one manually operated brake release valve mounted on the car and positionable between open and closed positions, said control valve including a cylinder release valve connected to said brake release valve, said cylinder release valve adapted to release the braking application when the brake release valve is positioned in the open position and to reset the braking application when the brake release valve is repositioned in the closed position, said control valve further including a reset valve for the brake release valve, said reset valve adapted to selectively actuate said brake release valve into closed position prior to an electronically controlled braking application, and said controller including means for electronically operating the reset valve.

100. The release and resetting means of claims 99, wherein the manually operated brake release valve includes a manually operated button.

101. The release and resetting means of claim 99, wherein the means for electronically operating the reset valve includes a solenoid.

102. In an electronic pneumatic brake system for a train having a locomotive and at least two cars connected to said locomotive, one of said cars having a universal electronic pneumatic control valve and a universal electronic pneumatic controller connected to and operating said control valve, said control valve and said controller adapted to respond to electronic commands from a head end unit on the locomotive or from pneumatic commands generated by the locomotive, a brake pipe on each of said cars and the locomotive intercommunicating with each other, air supply means in the locomotive for supplying air at desired levels of pressure to the brake pipes, and an air supply reservoir on each of said cars, the improvement in electronically controlled means in the universal control valve for propagating locomotive generated pneumatic braking and release commands to the other cars in the train, said means including:

an electronically controlled initial quick service valve connected to the brake pipe, said initial quick service valve adapted to selectively vent air pressure from the brake pipe to propagate the pneumatic braking command in the brake pipe to said other cars in the train, at least one electronically controlled release assist valve connecting the supply reservoir to the brake pipe, said release assist valve adapted to selectively back-dump air pressure from the supply reservoir to the brake pipe to propagate the pneumatic release command to said other cars in the train, means for measuring the pressure in the brake pipe, supply reservoir, and the brake cylinder and for providing signals to the controller, and means in the controller for electronically actuating the initial quick service valve and the release assist valve in direct response to said locomotive pneumatic braking and release commands.

103. The propagating means of claim 102, wherein the initial quick service valve is solenoid actuated and the release assist valve is solenoid actuated.

104. The propagating means of claim 102, wherein the control valve includes a plurality of release assist valves connected in parallel between the supply reservoir and the brake pipe.

105. The brake system of claim 102, which further includes means on the car having the universal control valve for supplying power to said controller.

106. The brake system of claim 105, wherein said power supplying means includes a battery rechargeable by a generator driven by an axle on said car.

107. In a train having a locomotive and at least two cars connected to said locomotive, a brake pipe on each car and the locomotive intercommunicating with each other, air supply means in the locomotive for supplying air at desired levels of pressure to the brake pipes, an air supply reservoir on each car, at least one brake cylinder on each car, and a purely pneumatic control valve on at least one car having means for propagating locomotive pneumatic braking and release commands in the brake pipe at a predetermined rate, the improvement in a universal electronic pneumatic control valve and a universal electronic pneumatic controller on said at least one car having electronically controlled means for propagating pneumatic braking and release commands in the brake pipe at substantially the same rate as the pneumatic control valve, said electronically controlled propagating means including:

means connected to the brake pipe for detecting locomotive pneumatic breaking and release commands, electronically controlled means for exhausting air pressure from said brake pipe when the detecting means senses a pneumatic braking command from the locomotive, and electronically controlled means for backdumping air pressure from said supply reservoir to said brake pipe when the detecting means senses a pneumatic release of a braking command from the locomotive, whereby the pneumatic commands from the locomotive determine the electronically controlled pneumatic propagation of the braking and release commands.

108. The universal control valve of claim 107, wherein the car includes an auxiliary air reservoir and an emergency air reservoir, and said universal control valve having means for combining said auxiliary and emergency reservoirs into said air supply reservoir.

109. The universal control valve of claim 107, which includes a pipe bracket having a service side and an emergency side, a manifold attached to each of said sides of the pipe bracket, and said manifold on the emergency side providing all normal and emergency braking and release of braking applications.

110. The universal control valve of claim 107, which includes means for constantly recharging the supply reservoir during normal and electronic emergency braking applications.

111. The universal control valve of claim 110, wherein the means for constantly recharging the supply reservoir includes means connecting the brake pipe to the supply reservoir through a check valve.

112. The universal control valve of claim 107, which further includes means for providing a two-stage braking application in pneumatic emergencies at substantially the same rate as the pneumatic control valve.

113. An electronic pneumatic brake system for a train having a locomotive and at least one car connected to said locomotive, said car having an electronic pneumatic control valve and an electronic pneumatic controller connected to and operating said control valve, a brake pipe on the car and the locomotive intercommunicating with each other, air supply means in the locomotive for supplying air at desired levels of pressure to the brake pipes, a supply reservoir on said car, at least one brake cylinder on said car, said control valve including:

means connecting the brake pipe to the air supply reservoir to charge the air supply reservoir and to maintain the air pressure in the supply reservoir at least to the level of the air pressure in the brake pipe, a relay valve for selectively connecting said supply reservoir to said brake cylinder, a pilot line connected to said relay valve, an application valve for selectively supplying air pressure to the pilot line to pressurize the pilot line and actuate the relay valve to produce a braking application, a release control valve for selectively exhausting air pressure from the pilot line to produce a release of the braking application, a pressure actuated emergency assuring valve for supplying a predetermined amount of air pressure to the pilot line to pressurize the pilot line in multiple stages during pneumatic emergencies to produce a multiple stage braking application, and means for measuring the pressures in the brake pipe, the supply reservoir, and the pilot line and/or the brake cylinder and for providing signals to the controller, said controller including means for operating the application valve and the release control valve, whereby said electronic pneumatic controller and control valve respond to braking and release commands generated by the locomotive.

114. The universal control valve of claim 113, which further includes regulating valve means for limiting the amount of air pressure supplied to the emergency assuring valve to limit the air pressure in the pilot line during pneumatic emergencies.

115. The universal control valve of claim 113, which further includes a diverter valve for selectively directing the air pressure through a choke to the pilot line.

* * * * *